Nov. 10, 1959  B. VOSSEN ET AL  2,911,646
AUTOMATION
Filed April 10, 1956  19 Sheets-Sheet 1
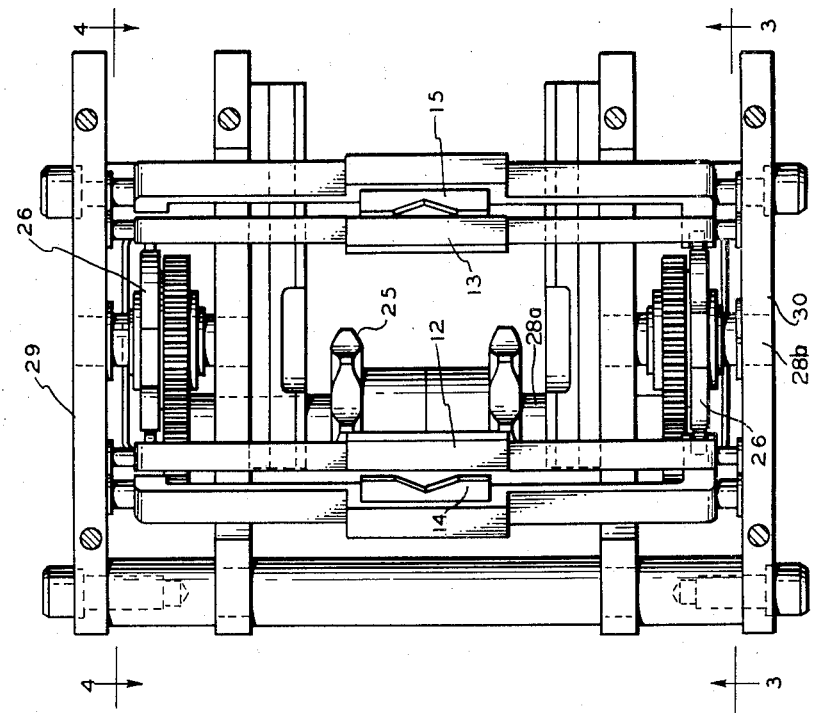
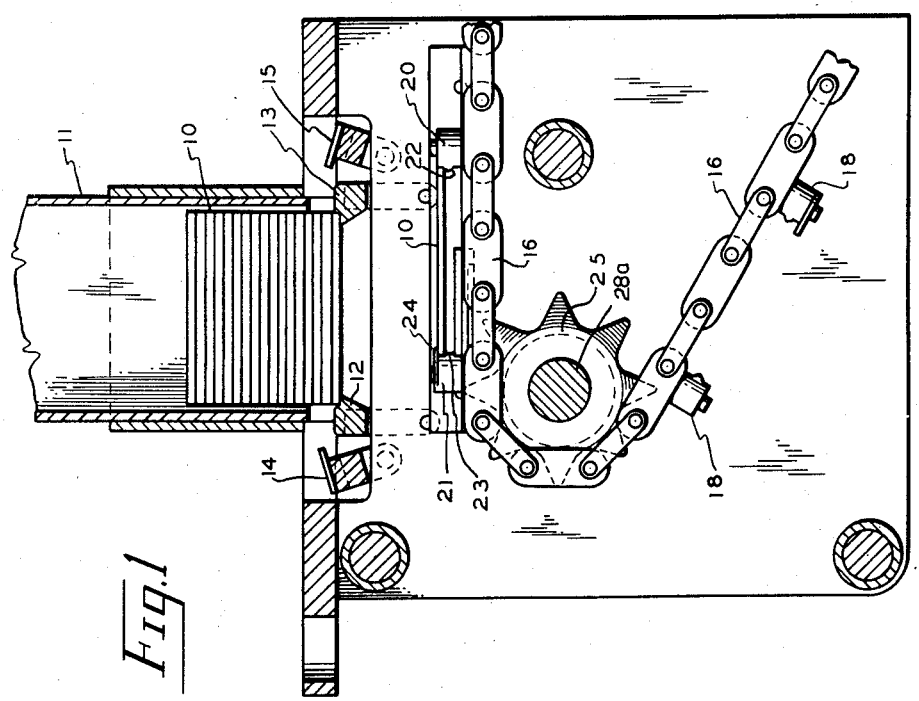

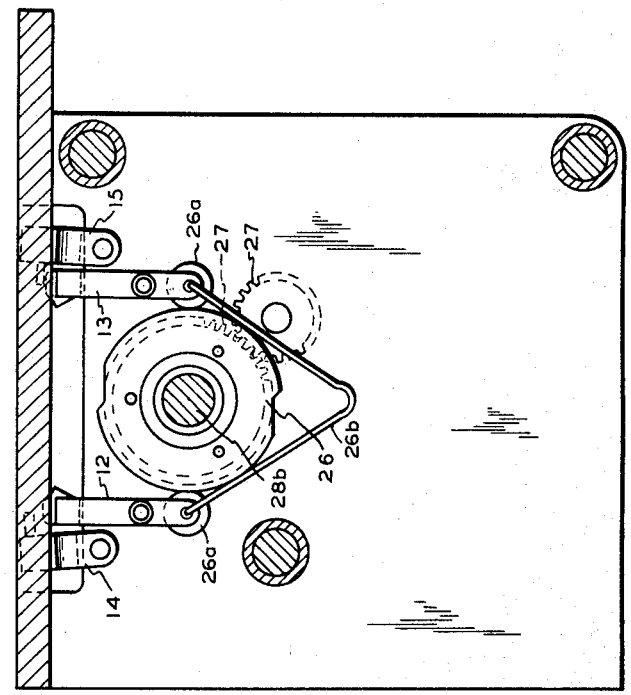
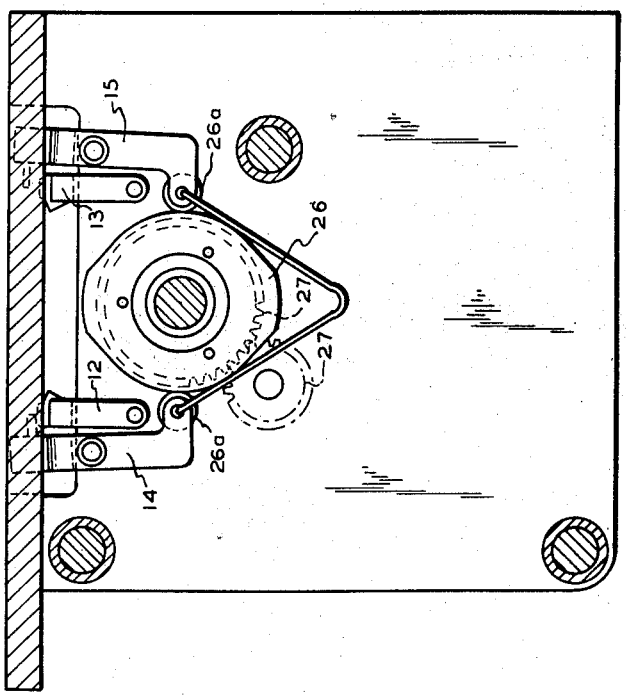

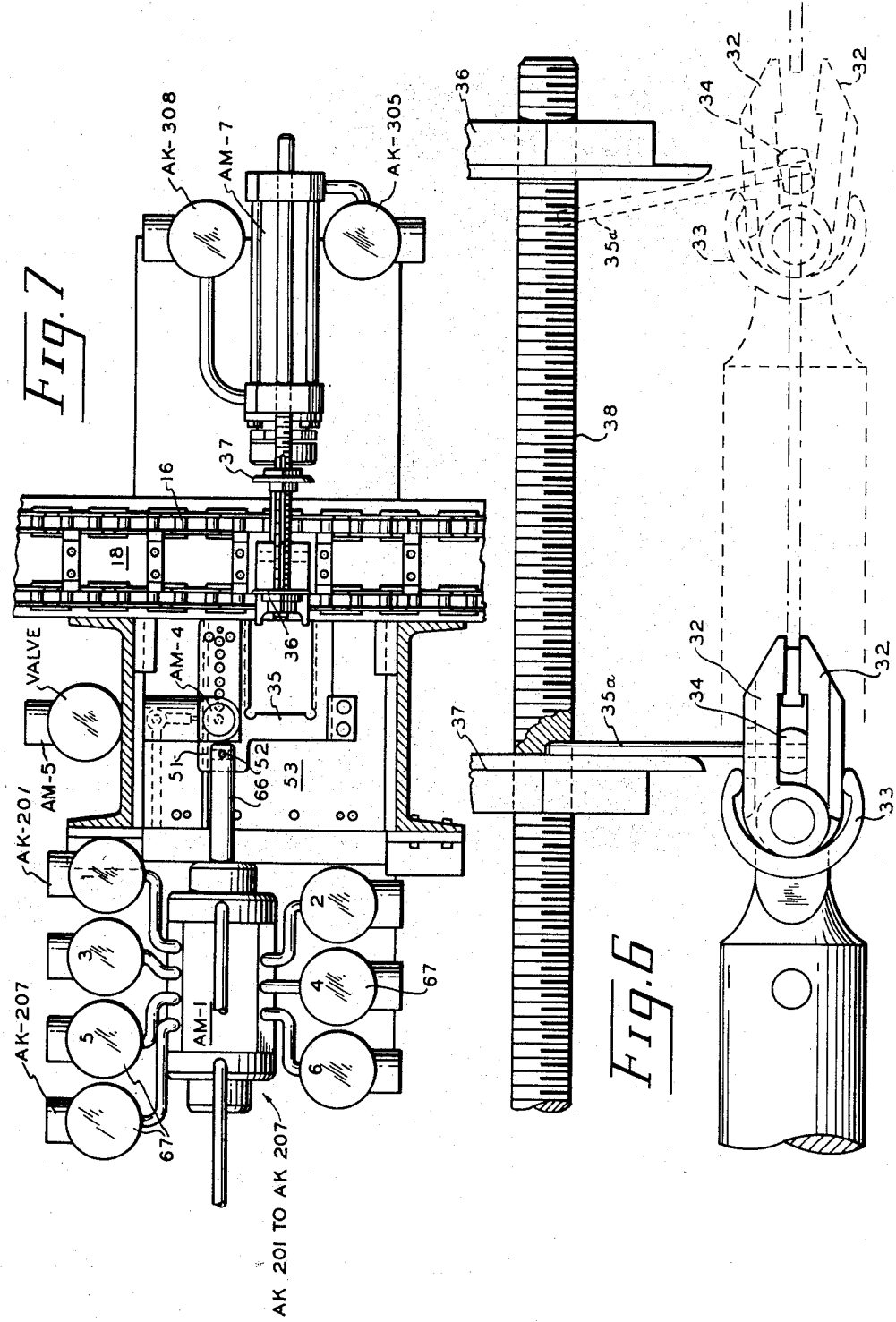

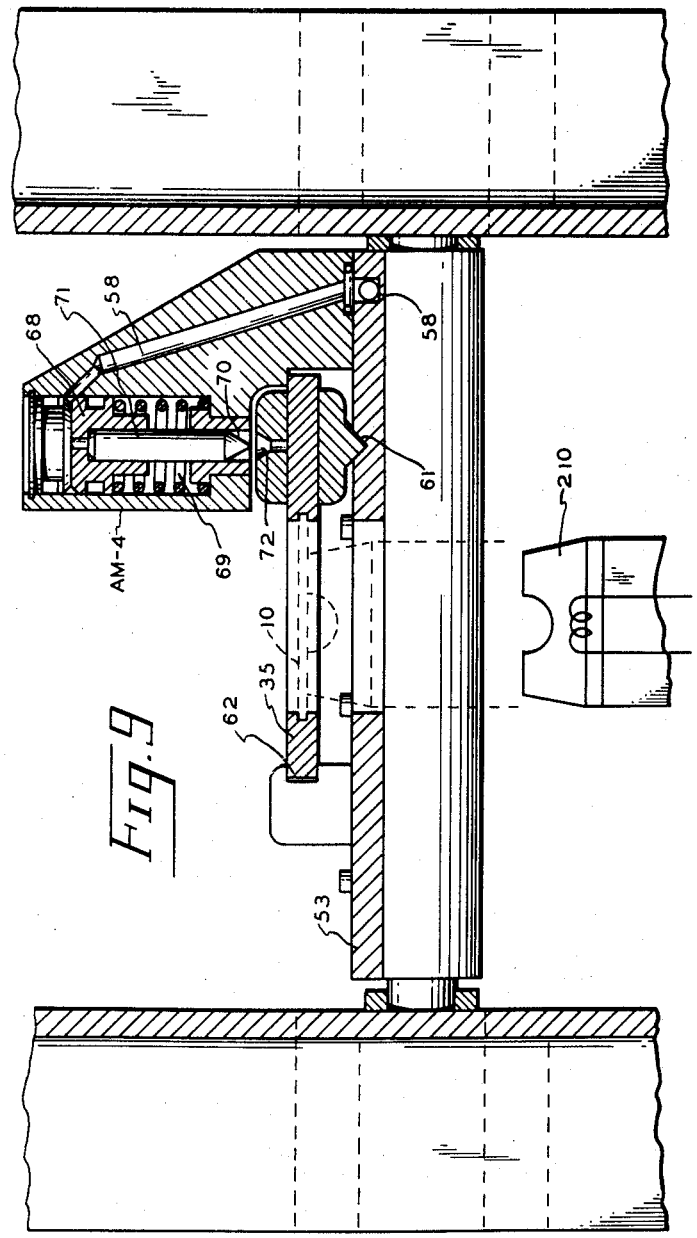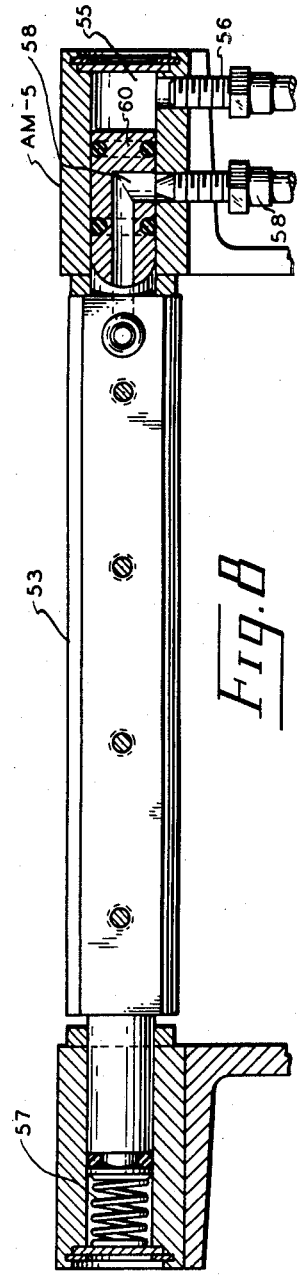

Nov. 10, 1959     B. VOSSEN ET AL     2,911,646
AUTOMATION

Filed April 10, 1956     19 Sheets-Sheet 6

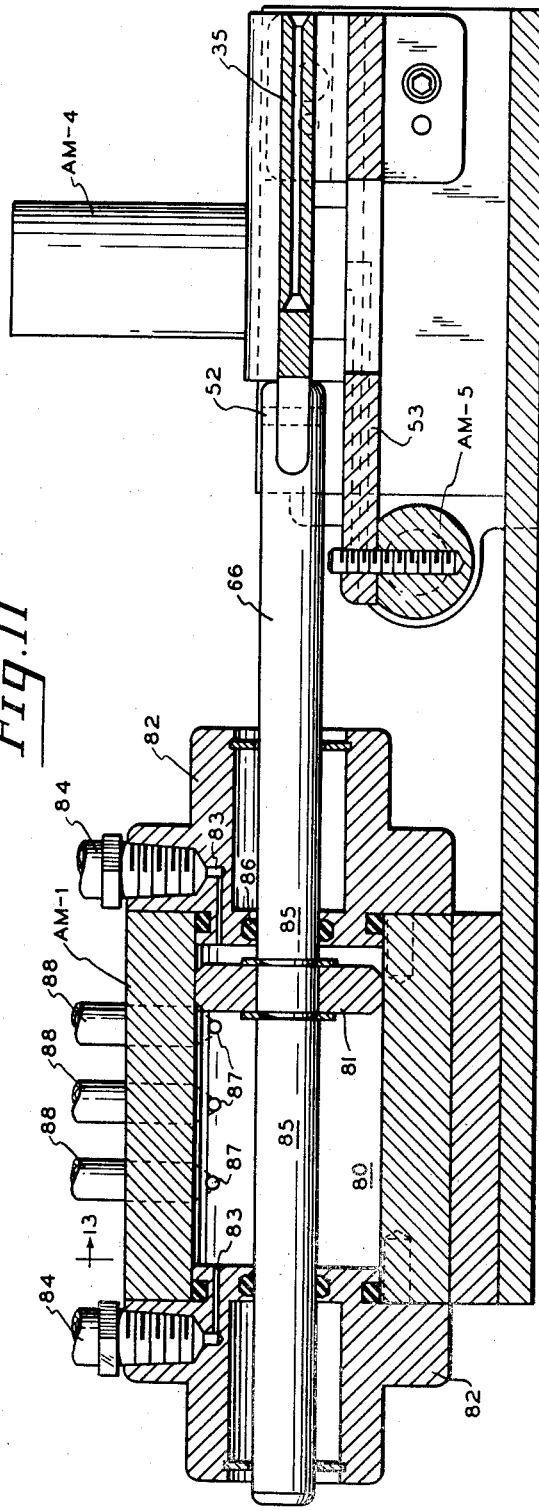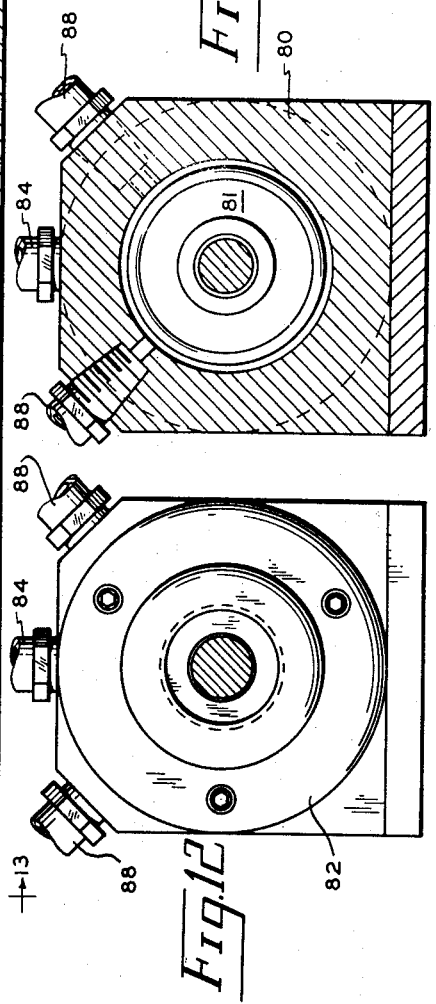

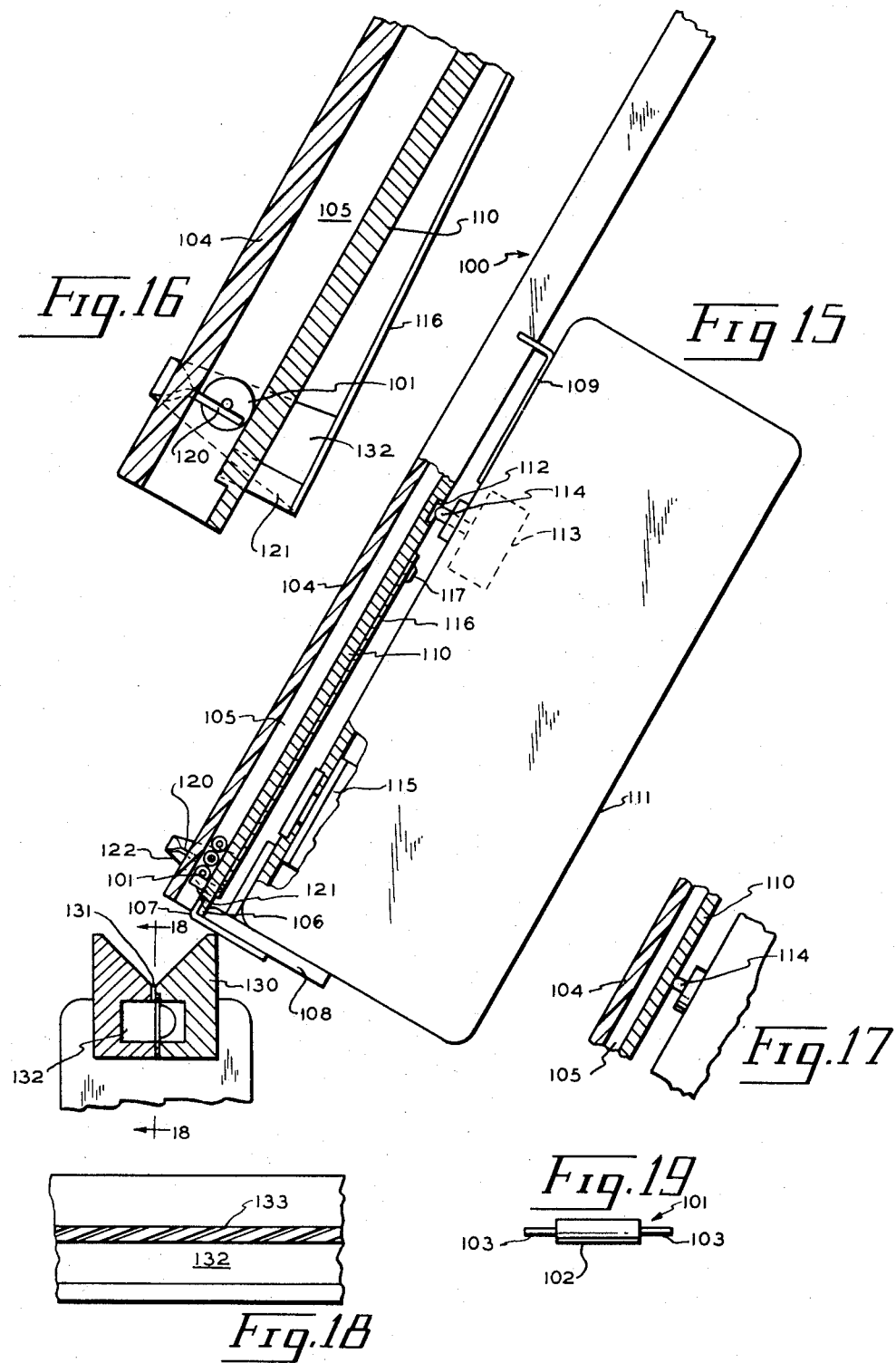

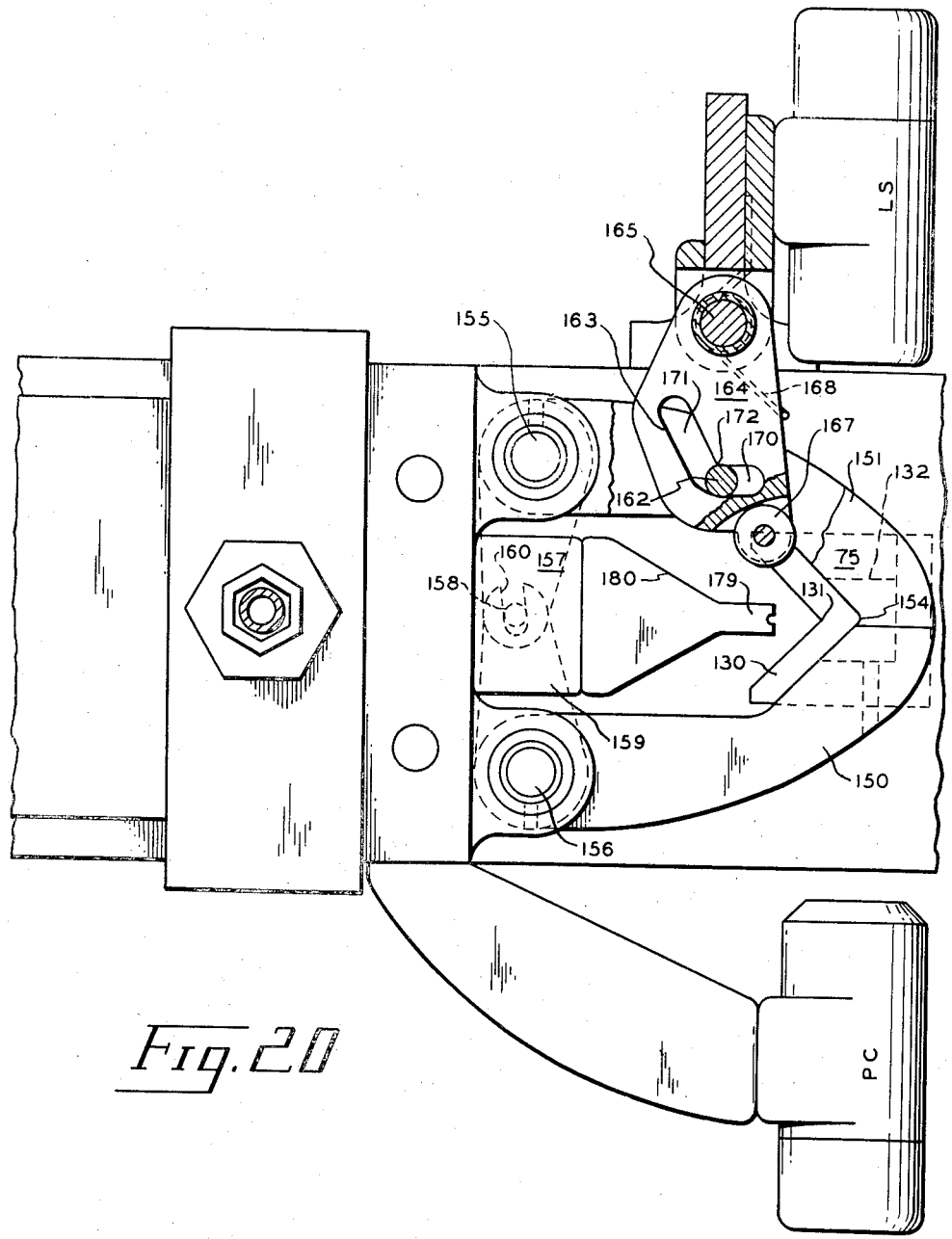

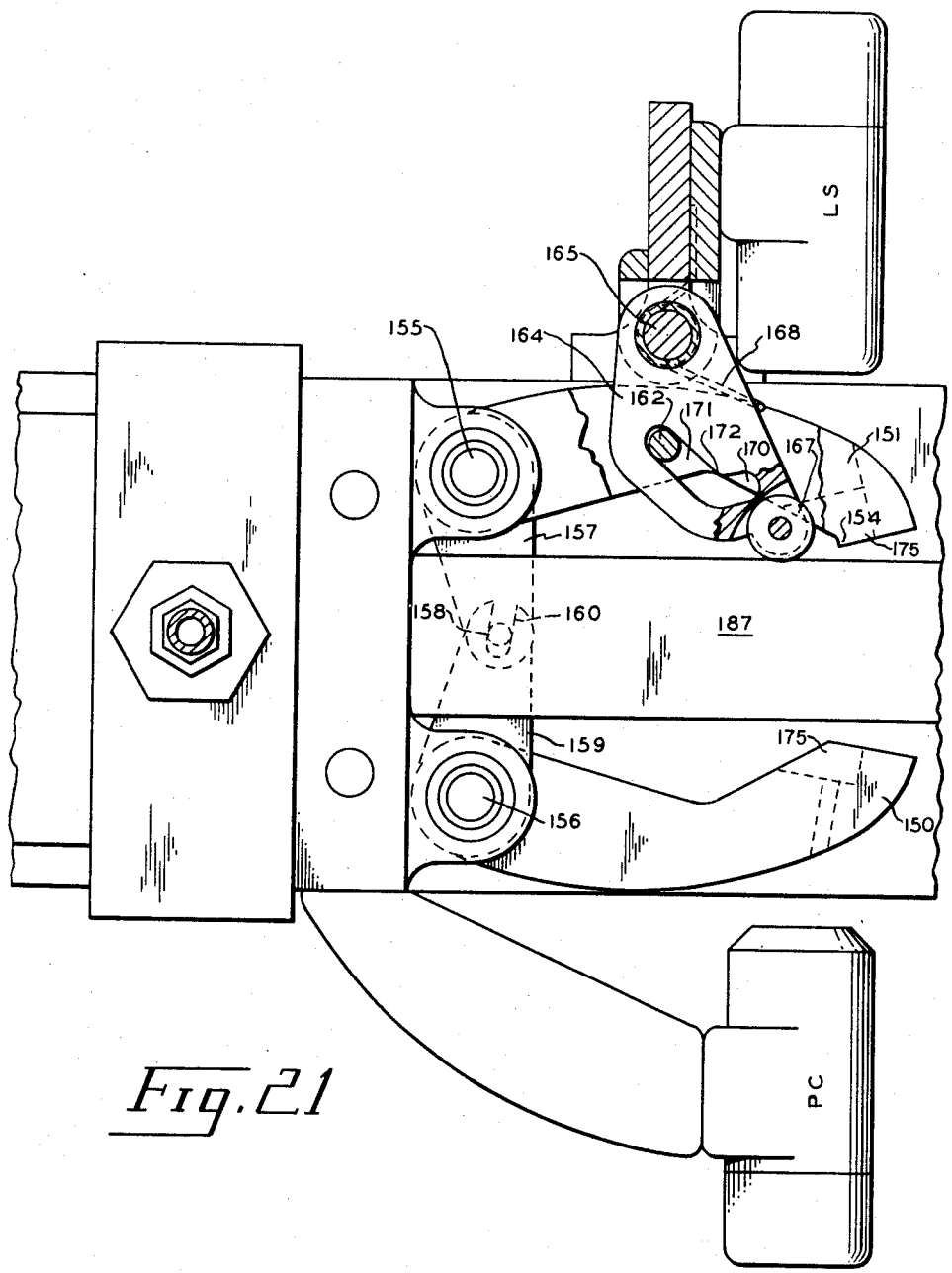

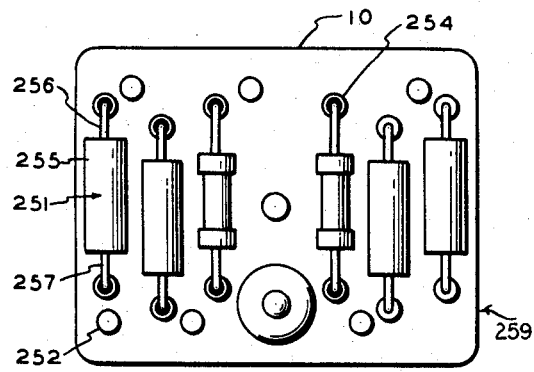
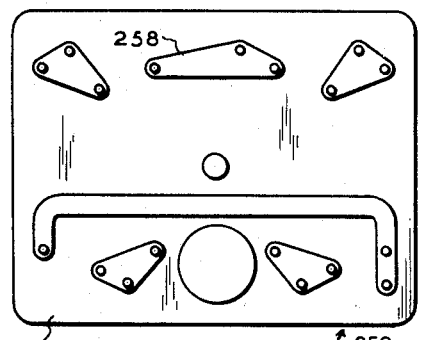
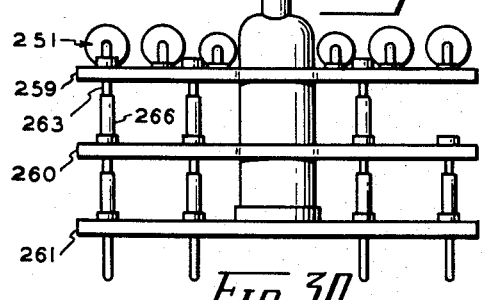
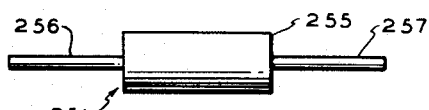
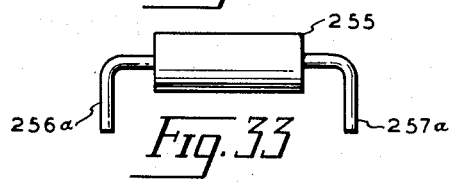
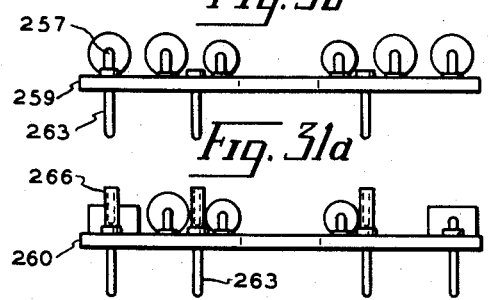
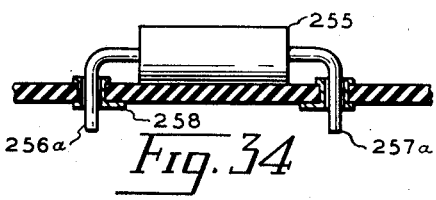
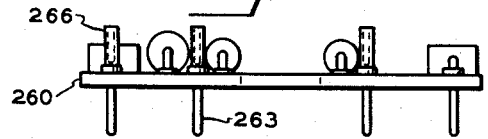
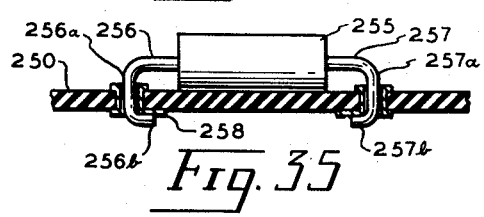
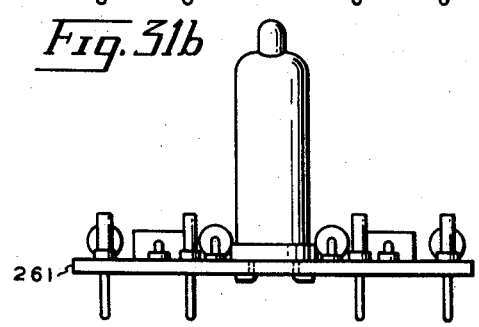

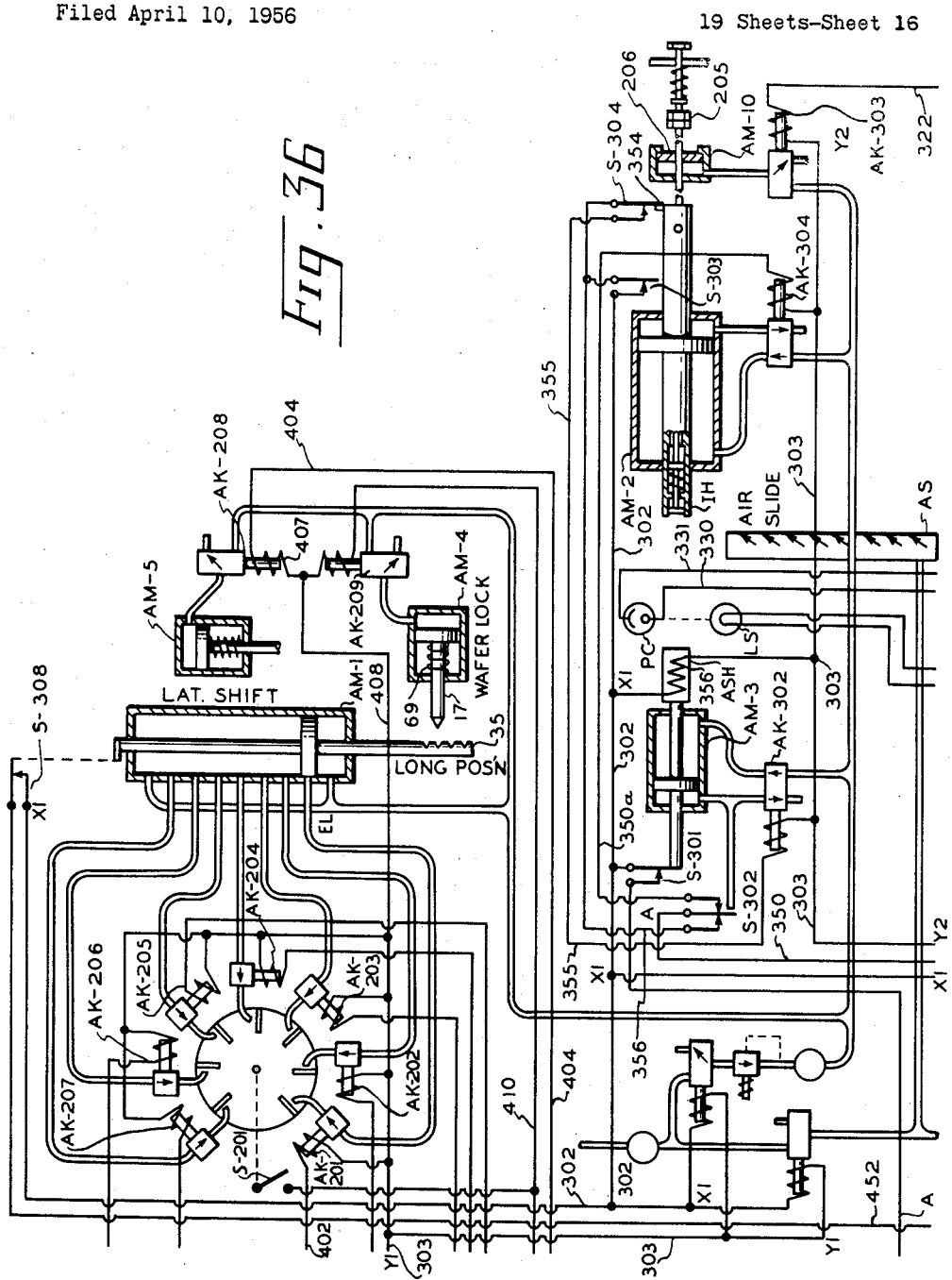

United States Patent Office 2,911,646
Patented Nov. 10, 1959

2,911,646

AUTOMATION

Bernd Vossen and Herbert K. Hazel, Arlington, Va., assignors to Melpar, Inc., Alexandria, Va., a corporation of New York Application April 10, 1956, Serial No. 577,330

19 Claims. (Cl. 1—106)

This application is related in subject matter, to applications for United States patent, as follows:

Lawson et al., Serial No. 413,092 filed March 1, 1954, for Stapling Machines and issued as Patent 2,904,785.

Vossen et al., Serial No. 493,392 filed March 10, 1955, for Stapling Machines and issued as Patent 2,904,786.

Vossen et al., Serial No. 473,251, filed December 6, 1954, for Automatic Machinery and issued as Patent 2,868,413.

Hazel, Serial No. 513,782 filed June 7, 1955, for Stapling Machines and issued as Patent 2,778,691.

This application is also related to the following applications for United States patent, filed concurrently herewith, as follows:

K. Hazel for Component Feed and Insertion, Serial No. 577,329 filed April 10, 1956.

B. Vossen for Wafer Feed and Insertion, Serial No. 577,328 filed April 10, 1956.

The present invention relates generally to automatic machines for fabricating electronic sub-assemblies, and more particularly to automatic or semi-automatic machines for assembling electrical components, such as resistors, selected automatically from a large number of available types, at pre-selected positions on a wafer, and soldering the components to printed circuitry previously placed on the wafer.

The problem of automatic assembly or fabrication of electrical or electronic sub-assemblies is receiving considerable attention, and various approaches have been attempted. In accordance with the present invention, a wafer, in the form of a thin sheet of insulating material, is provided with a plurality of aperture pairs, for insertion of the terminal leads of standard electrical components therein. The aperture pairs are located at predetermined locations for all wafers employed in the system, and a predetermined number of component positions are thus rendered available. A wafer positioning mechanism, in the form of a pneumatic servo system, is available for selectively positioning the wafers, so that any desired pair of apertures may be positioned under a stapling head, for insertion of a component. The fact that a limited number of aperture pair positions is employed enables simplification of the servo system without limitation on the operation of the machine in a practical sense, since the locations of the aperture pairs may be selected in view of the dimensional requirements of the components employed.

Each wafer is provided with pre-tinned printed circuitry on one of its sides, and the components are secured to the other side, the wire terminals of the components passing through the apertures, being bent into stapled relation to the wafer and into intimate contact with the printed circuitry. During the stapling process the wire terminals are heated sufficiently to form a soldered joint with the printed circuitry. By pre-tinning the printed circuitry, just the correct thickness of solder may be made available, and no problems of solder application arise in the operation of the machine.

In order to provide pre-selected components to the assembly or stapling position, components of identical type are stacked in separate gravity feed hoppers, adjacent a pneumatic conveyor. The separate components may be delivered to the conveyor by electro-magnetically actuating hopper gates, each of which is associated with one hopper, and designed to drop one component when briefly electrically energized. The problem of providing selected components to the conveyor in order becomes, then, one of selectively energizing the hopper gates.

The conveyor itself comprises an elongated channel, generally of V cross-section, and having air nozzles distributed along the base of the V. The air nozzles are all directed so as to impel components which fall into the channel toward an egress point at which is located a wafer holder and positioning device, and a stapling head.

Each component, as it is dropped into the channel, is rapidly blown to the stapling position, where it is stapled to a wafer, previously positioned. After a stapling operation is completed, a new component is dropped and the wafer repositioned to accept same. The described construction permits use of a large variety of components, because the component hoppers may be of relatively slight width, and the conveyor may be of any desired length. Moreover, the conveyor may be of considerable width, and the hoppers relatively thin, so that hoppers may be distributed both lengthwise and widthwise of the conveyor, if desired.

The moving components of the machine are operated by pneumatic servos, electrically controlled. In particular the wafers are positioned in two coordinate directions by a pair of servos acting at right angles relative to one another. This enables complete positioning, in two co-ordinate directions, on a quantized basis, so that any pre-selected pair of wafer apertures may be placed in component insertion position, by selecting one servo control electro-magnet for each position, in one coordinate direction, and by appropriately controlling a further servo-motor to establish position in a second coordinate direction.

Once a selected component has been made available to the stapling position, and a wafer has been appropriately positioned, a stapling and soldering head is actuated pneumatically. The stapling head removes a component from stapling position, bends the wire leads of the component at right angles to the component, carries the component down to the wafer, and inserts the bent leads through the apertures in the wafer. The anvil of the stapling and soldering head moves up under the wafer, forms the staple by further bending the wire ends into proximity to and in parallelism with the under side of the wafer, and simultaneously heats the wire ends and the pre-tinning on the printed circuitry sufficiently to effect soldering.

Wafers are fed in succession from a remote hopper to the stapling and soldering position by means of a chain conveyor, which is maintained continually filled. A wafer transition mechanism abstracts the wafers, one by one, from the chain conveyor, and places them in the wafer positioning carriage, in timed sequence. The latter is, in turn, controlled by the two-coordinate servo system, above described.

The selections of components and of wafer positions, in the system above described, may be controlled either in response to selectively actuatable push-button switches, or by means of punched cards, or equivalents thereof, each card containing sufficient control information to complete assembling of one set of components on one wafer. The cards contain, accordingly, co-ordinated information concerning wafer position. A given card contains control information for a single complete sub-assembly, and cards may be punched for any combination of component types and wafer locations which are within the capability of the machine, as well as for the order of assembly of the components on the wafer.

While wafer positions and components may be selected either manually, or in response to recorded data, as, for example, punched cards, the cycling of the present system is controlled, as to each event in the cycle, by the completion of the preceding event, and interlocked circuits are provided to prevent incorrect cycling, or incorrectly timed cycling.

It is, accordingly, a broad object of the present invention to provide a novel automatic machine for fabricating electronic or electrical sub-assemblies.

It is a further object of the present invention to provide mechanism for feeding wafers and electrical components in ordered relation to an assembly position.

It is another object of the present invention to provide a system of punched-card controlled electrical sub-assembly fabrication.

A further object of the present invention resides in the provision of a system of automatic electrical sub-assembly in which electrical components are assembled on wafers, and in which selection of plural components and of positions of the wafer to which the components will be secured is controlled automatically in response to control data on a record.

It is another object of the present invention to provide a system of automatic assembly of electrical components in wafers, which involves multiple components and multiple wafer positions, each separate component being secured to a predetermined wafer position, wherein the cycle of operations required to supply a wafer in assembly position, to position the wafer, to supply a component, to assemble the component on the wafer, to withdraw a finished wafer, and other operations, are each initiated in response to completion of a preceding operation.

It is a further object of the present invention to provide a novel device for forming an electrical component as a staple, and for inserting the staple in a wafer.

It is still a further object of my invention to provide a system of wafer positioning, by electrically controlled pneumatic motors, in two co-ordinate directions, by means of two motors, and in response to $n+1$ signals, where $2n$ discrete wafer positions are required.

A further object of my invention resides in the provision of a novel wafer feed mechanism, which provides devices for abstracting wafers one at a time from a wafer magazine, and feeding the wafers accurately to a further position at which the wafers are loaded on a positioning carriage.

It is still another object of the present invention to provide a system for abstracting wafers from a magazine, securing said wafers at predetermined positions of a chain drive, feeding the wafers by means of the chain drive to an operating position, transferring the wafers from the chain drive to an operating platform at the latter position, transferring the wafer to its original position on the chain drive at the end of an operation at the operating platform, and delivering the wafer to an unloading point.

It is another object of the present invention to provide a novel device for abstracting wafers from a magazine, one by one, and for securing the wafers in fixed position on a chain conveyor in response to the abstracting operation.

A further object of the invention resides in the provision of a component stapling unit, wherein the component may be stapled to the wafer at selectively different spacing with respect to the wafer, to make allowance for different thicknesses of component body.

The above and still further objects, features and advantages of the present invention will become apparent upon consideration of the following detailed description of one specific embodiment thereof, especially when taken in conjunction with the accompanying drawings, wherein:

Figure 1 is a view in section of a wafer magazine, and of mechanism for delivering wafers to a chain conveyor;

Figure 2 is a view in plan, with wafer magazine removed, showing wafer delivering elements;

Figures 3 and 4 illustrate in side elevation mechanism for supporting a stack of wafers, and for delivering these one by one;

Figure 6 is a view in side elevation, enlarged, of wafer transfer jaws and actuators;

Figure 7 is a view in plan, corresponding generally with Figure 5;

Figure 8 is a view in section, taken in elevation, of an element of a wafer positioning carriage and its transverse positioning motor;

Figure 9 is a view in section, taken transversely, of the wafer positioning carriage, including particularly a carriage locking motor;

Figure 11 is a view in section, taken in elevation, of a wafer carriage servo-motor, for longitudinal positioning, a wafer carriage locking motor, a wafer carriage transverse feed device, a wafer locking motor, and a wafer holding carriage;

Figure 12 is an end view corresponding with Figure 11;

Figure 13 is a view in transverse cross-section taken on the line 13—13 of Figure 11;

Figure 15 is a view in transverse section, taken on the line 15—15 of Figure 14;

Figure 16 is an enlarged view of a portion of Figure 15, showing an alternate position of a wafer dispensing gate;

Figure 17 is a partial sectional view showing a switch actuator, actuated by a component hopper;

Figure 18 is a partial view in longitudinal section taken through a pneumatic component conveyor;

Figure 19 is a view in elevation of an electrical component, specifically a resistor;

Figure 20 is a view in front elevation of a staple forming and stapling head;

Figure 21 is a view corresponding with Figure 20, illustrating a different position of certain parts;

Figure 28 is a view in plan of a sub-assembly in accordance with the invention including a wafer having electrical components assembled thereto;

Figure 29 is a view in plan illustrating the sub-assembly of Figure 28 as seen from the underside;

Figure 30 is a view in elevation of an assemblage in vertically superposed relation of three sub-assemblies in accordance with the invention;

Figure 5:
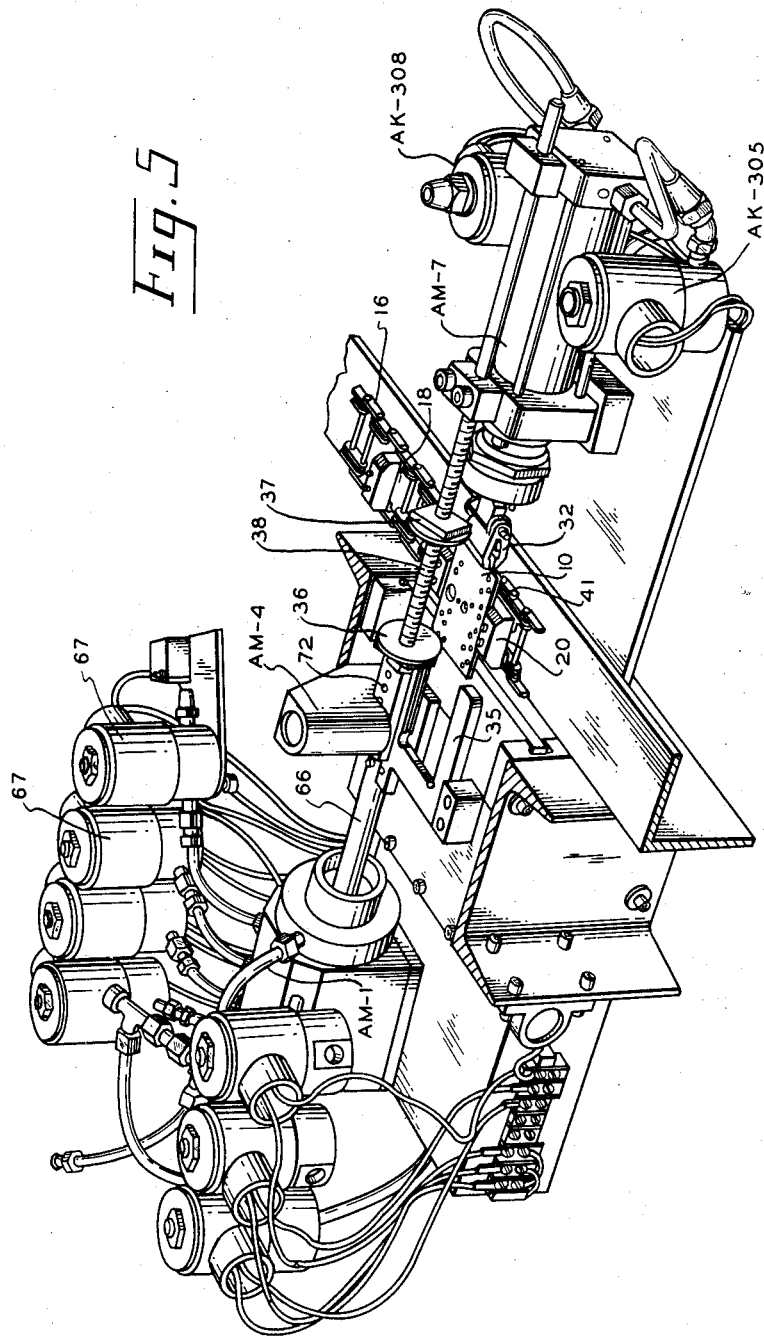
Figure 5 is a view in perspective of a wafer transfer and positioning system.

Figures 31a, 31b, and 31c are views in elevation of the sub-assemblies of Figure 30 in separated relation;

Figure 32 shows in elevation a common electrical component as supplied commercially, and which may be employed in the practice of the invention;

Figure 33 is a view in elevation of a component of Figure 32 with terminal leads bent preparatory to inserting in a wafer.

Figure 34 is a view in elevation of a component of Figure 33 with leads inserted in wafer apertures;

Figure 35 is a view in elevation of a component inserted in wafer apertures and upset in final stapled relation;

Figures 36, 37, 38 and 39 taken together constitute a circuit diagram of a system in accordance with the invention.

Feed and positioning of wafers

Referring now more particularly to the accompanying drawings, and particularly to Figures 1 and 2 thereof, wafers 10 are supplied in a vertical stack in a hopper 11. The bottom-most wafer of the stack rests adjacent its edges, on a pair of pivotally removable supports 12, 13. Stack retaining fingers 14, 15 lie adjacent the supports 12, 13, and are movable into engagement with the edges of the next higher wafer. The stack of wafers 10 overlies a point of curvature of a chain conveyor 16, which is driven in discrete steps, and conveys the wafers one by one to a wafer positioning station, lying adjacent the center of the conveyor belt. The sequence of operations in dropping the wafers on the chain conveyor 16, one by one, is to bring the fingers 14, 15 together, which retains all the wafers in the stack except the bottom wafer. The supports 12, 13 are then separated, which permits the bottom wafer alone to fall onto the chain conveyor 16. The supports 12, 13 are again repositioned to stack supporting position, and fingers 14, 15 are separated.

The conveyor chain 16 is endless, and is provided, approximately at 4" intervals with pairs of wafer carriers 18. The latter are fixed to links of the chain, and include two dissimilar elements, 20 and 21, one behind the other. The advanced element, 20, includes a ledge 22 underlying the wafer, and none overlying the wafer. The remaining element 21 includes a ledge 23, underlying the wafer, and also a lip 24 which overlies the wafer at its rearward edge. The wafer 10 is dropped onto the wafer carriers just as the rearward element 24 is about to come around a turn. Accordingly, the lip 24 is withdrawn or spaced from element 20, by a greater distance than is the case while the carrier is traveling rectilinearly. As the element 21 passes beyond the turn, the lip 24 is caused to pass over the rearward edge of the wafer 10, retaining the latter on the carrier. The specified turn is produced by passage of the chain 16 over the idler sprocket 25.

The supports 12, 13 and retainers 14, 15 are actuated by cams 26, the cam followers 26a pressed against cam 26 by V-shaped spring 26b, which are driven in synchronism with the rotation of sprocket 25, as by gearing 27 (Figures 3 and 4).

The various gearings, cams, sprockets, and the like, referred to in the preceding two paragraphs hereof, rotate on cross-shafts 28a, 28b extending between plates 29, 30, in a manner which is, per se, conventional.

Eventually the wafer 10 arrives at a carriage loading position (Figure 5). At this position subsists a pair of gripper jaws 32, which are normally spring urged together by a spring 33. Secured between the jaws 32 is a cam 34 (Fig. 6), secured to a vertical rod 35a, the cam 34 serving when rotated in either sense, i.e. clockwise or counter-clockwise, to open the jaws 32. The jaws are actuatable toward and away from a wafer holder 35. A pair of cam actuators 36, 37 are located adjustably on a screw-threaded rod 38, which extends in the direction of travel of the jaws 32. The actuator 37 normally retains the jaws 32 open, in the withdrawn position, so that the wafer 10 may pass therebetween. When a wafer 10 is positioned opposite the holder 35 the jaws 32 are actuated forwardly by a pneumatic motor AM-7 controlled by electrically actuated valves AK-305 and AK-308, which control respectively the rearward and forward thrusts of motor AM-7. As the jaws 32 move forwardly the cam rod 35a leaves the actuator 37, permitting the jaws 32 to close on the wafer 10 and to carry the wafer 10 into the holder 35, which it snugly fits. As the jaws 32 reach the end of their travel, the rod 35a moves against the actuator 36, which causes the jaws 32 to again open. The jaws remain in the last position until the wafer has been completed, after which the motor AM-7 returns the jaws. The return motion permits the jaws 32 to close on the wafer, pulling the wafer back onto its original position on the chain conveyor 16, which in the course of time delivers the wafer to an unloading position.

Figure 10:
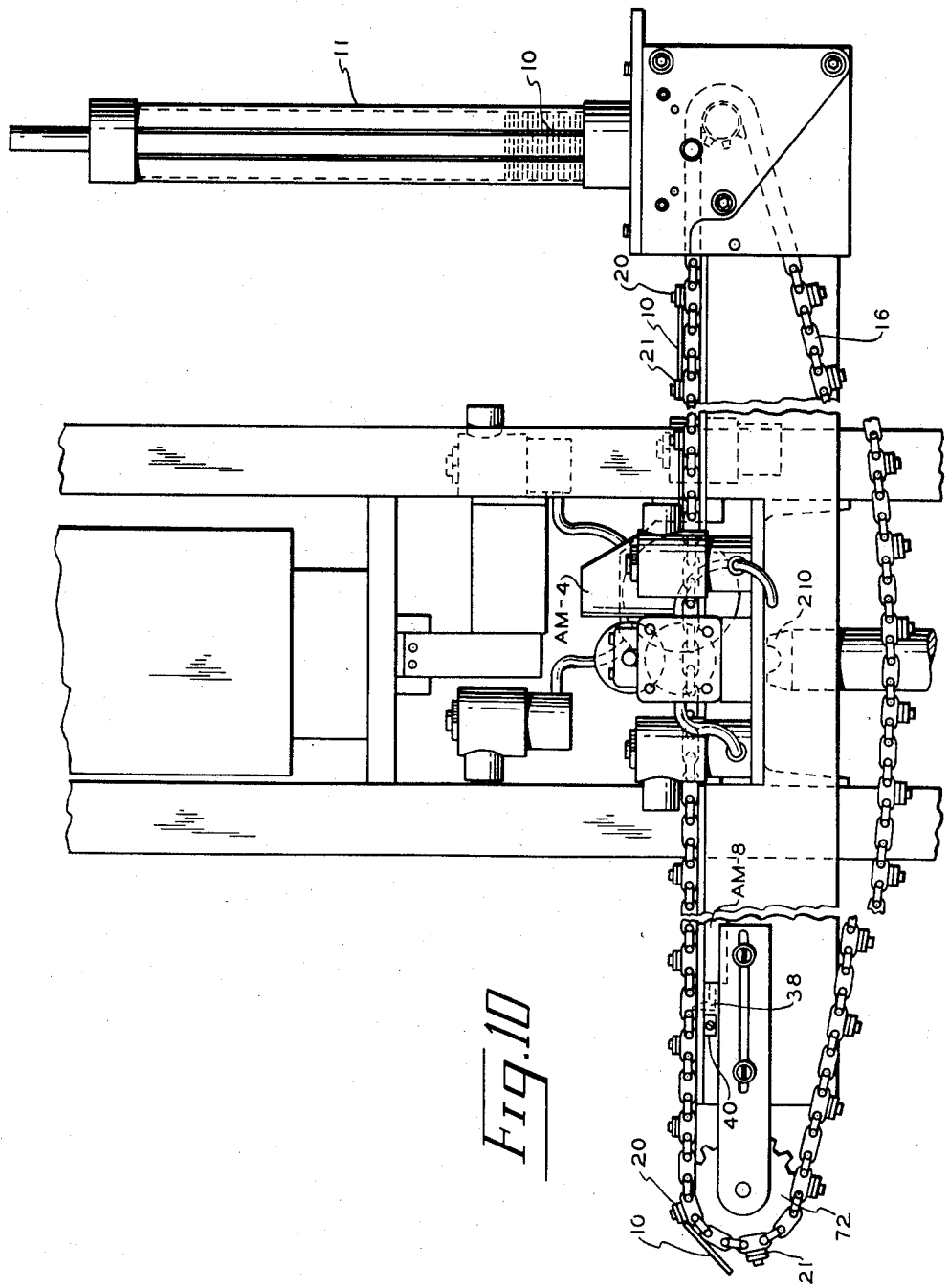
Figure 10 is a view in side elevation of a wafer conveyor wafer magazine, and, in outline, component stapling and soldering heads.
Figure 14:
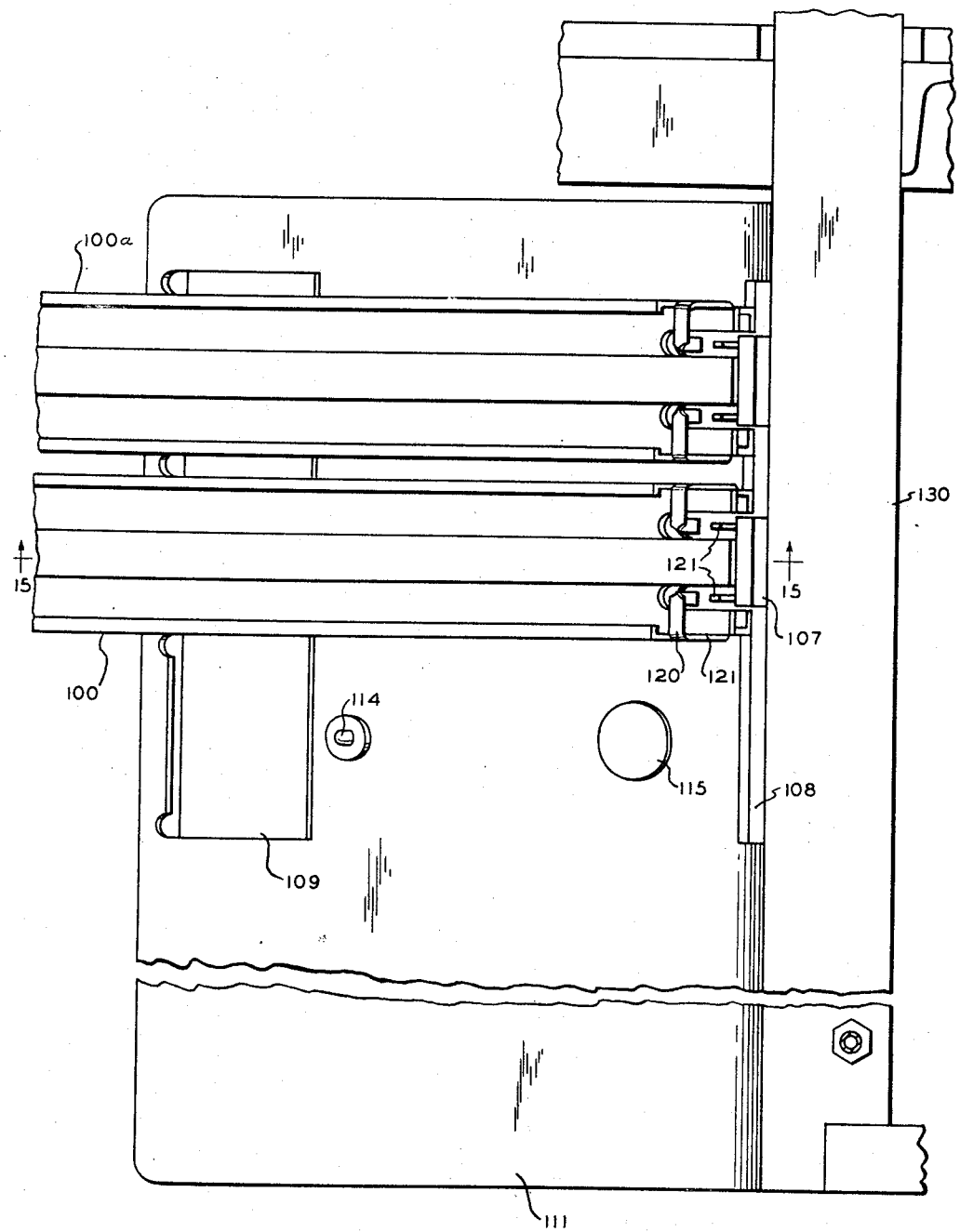
Figure 14 is a view in front elevation of component dispensing devices, and of a pneumatic conveyor for components.

The chain 16 is actuated in discrete steps, by means of a pneumatic motor AM-8, Figure 10. The latter actuates a pawl 38, which engages a link of the chain and moves some forwardly until the pawl 38 is stopped by a stop 40. Accordingly, the final position of the chain 16, on each step, positively relates the position of wafer holder 18, and stop 40, and hence of holder 35.

Once the wafer 10 has been positioned in the holder 35, the latter is positioned in a plurality of positions in sequence, each position bringing a different pair of apertures 41, Figure 5, in the wafer 10 under a stapling and soldering head. Electrical components, such as resistors, having oppositely extending end leads, are delivered to the stapling and soldering head, in proper sequence and of proper type, for insertion in the selected apertures, as will appear hereinafter.

The wafer holder 35 is movable in two coordinate directions, by means of two pneumatic servo-motors. The first of these motors, AM-5, Figure 7, is known as a shift motor, since it moves an under-carriage for wafer holder 35 in transverse direction, to either of two positions. The wafer holder 35 includes a slot 51, Figure 7, which rides freely on a vertical pin 52. The pin 52 serves to actuate the holder 35 longitudinally (i.e. from left to right, as seen in Figure 7), and with respect to the carriage 53, and is secured to the piston rod of motor AM-1. More specifically, the wafer holder 35 is slidable on and with respect to the carriage 53, to any one of seven predetermined positions in response to a multi-position servo-motor AM-1; and is coupled to the servo-motor AM-1 by means of the pin 52 and the slot 51. The length of slot 51 is sufficient to enable the lateral shift of the carriage 53, and with it of the wafer holder 35, with respect to pin 52.

The pneumatic shift motor AM-5 consists of a pneumatic cylinder 55, supplied with air under pressure by means of a line 56. The piston 60 of motor AM-5 corresponds with an extension of carriage 53, and is biassed to one lateral position against the pressure in cylinder 55 by means of a spring 57. Accordingly, the piston 60 moves left (as seen in Figure 8) when air is introduced into cylinder 55, and moves to the right when the air is exhausted. The air conduit 56 supplies air to motor AM-5. A further air conduit 58 supplies air under pressure to a locking motor AM-4. Motion of the piston 60, in response to air pressure in cylinder 55, does not break the air line 58, because the total motion of carriage 53 is slight.

The wafer holder 35 slides in bearings 61, 62 (Fig. 9) with respect to holder carriage 53, being actuated by the hydraulic multiposition servo-motor AM-1. The piston rod 66 of the latter may be positioned in seven different positions (for example only) in accordance with which one of seven electrically controlled pneumatic valves AK-201 to AK-207 is selected. The structural details of the servo-motor AM-1 are disclosed, and its operation explained in an application for patent filed in the name of Lawson and Hazel, Serial No. 564,020, on February 7, 1955, entitled Servo-Motors, and which is assigned to the same assignee as is the present application.

When the wafer holder 35 has attained a desired position air is supplied to line 58, which actuates the piston 68, of pneumatic motor AM-4 downwardly, against the force of helical spring 69. The tapered end 70 of a pin 71 is actuated by piston 68 into engagement with one of mating tapered recesses 72 in holder wafer 35. This action locks the wafer holder 35 against all motion, longitudinal or lateral, during component insertion and component soldering, and also serves accurately to position the wafer holder, and hence the wafer 10, so that the ends of a formed component will accurately pass into apertures 41 provided in the wafer 10. After a selected component has been secured and soldered to the wafer, the rod 71 is permitted to rise, by exhausting air from pneumatic motor AM–4. The wafer holder 35 is then repositioned for the next wafer, the rod 71 is again lowered, and the succeeding component inserted in its proper position. The process of locking the wafer holder, inserting a component, unlocking the wafer holder, repositioning and relocking the wafer holder inserting a further component, is repeated until a sub-assembly is complete.

After the required complement of components has been stapled to the wafer 10, a circuit is energized to signal for a new wafer. The wafer then in the holder 35 is then gripped by jaws 32 which are pulled back to redeposit the wafer on its original wafer carrier 18, which has not moved in the meantime. Thereafter, the chain advance motor AM–8 advances the chain one step, bringing a new wafer into operative position. When the latter operation is complete, the transition motor AM–7 advances a new wafer from the wafer carrier 18 into the wafer holder 35.

The finished wafer is delivered by release from the carrier 18, by gravity, at the far end of the chain drive 16, as the latter rounds the sprocket 72, Figure 10. The process of release is automatic in that the process of passing the holder around a circle of small radius at the far end of chain drive 16 separates the holding elements 20, 21.

The utilization of the ends of the chain drive and the rotation of the latter both to clamp in and to release wafers from the wafer holding elements 20, 21 of the system, renders unnecessary special mechanisms for this purpose, and the securing of the wafer holder elements to chain links assures accurate positioning of the wafers at the transition position, in response to pawl actuation of the chain.

Servo-motor

The servo-motor AM–1, Figures 11, 12, and 13, comprises a hollow cylinder 80, having therein a snugly fitting piston 81. The ends of the cylinder 80 are closed by end caps 82, which support passages 83, and fittings 84, for supplying pneumatic fluid at equal pressure to the opposing ends of the cylinder 80. The piston 81 is mounted on oppositely extending shafts 85, of equal diameters, which move in suitable pressure tight bearings 86, in the form of O-rings. The areas of opposite sides of the piston 81 are equal, so that the piston may be subjected to equal total pneumatic pressures in response to equal input pressures in p.s.i. A plurality of exhaust ports 87 is provided in the wall of cylinder 80, and distributed longitudinally of cylinder 80. To each of the ports 87 is coupled an exhaust conduit 88. These are normally closed by electrically controlled pneumatic valves AK–201 to AK–207, inclusive. Opening of any one of these valves exhausts pneumatic pressure from one side of the piston 81, since the exhaust ports and conduits are arranged to be of greater capacity than the input ports and conduits. The pressures on opposite sides of the piston 81 are thus unbalanced, and the piston 81 is moved until it covers and closes the open port. This is its final position. When that position has been reached and the port covered, as signalled by termination of the exhaust process, a pressure responsive switch (S–201), normally maintained open by exhaust gases deriving from any of the ports 87 closes and energizes the locking motor AM–4. The lateral position of the carriage 53, and hence of the holder 35, is determined by a two position pneumatic servo-motor AM–5, as has been explained hereinbefore. In the alternative, pressure responsive switch S–201 may be located in the air input line of motor AM–1 and signal a drop in pressure, caused by exhaust of air through any one of the ports 87.

Component selection and delivery

Referring now more particularly to Figures 14–19 of the accompanying drawings, the reference numeral 100 denotes a hopper for components 101. In Figure 19 a typical component, 101, is illustrated in the form of an electrical resistor of the ½ watt or ¼ watt size. The component 101 includes a relatively fragile cylindrical body 102, and a pair of wire leads 103 extending axially from either end thereof.

The hopper 100 is preferably fabricated of aluminum, or other non-magnetic metal, except for a transparent face plate 104, and includes a channel 105 dimensioned in thickness and width to accept a large number of superposed components 101. The hopper 100 is oriented to permit the components to fall by gravity, but is preferably not vertical, rather making an angle of about 60° to the horizontal.

The lower end of each hopper 100 includes a lip 106, which interlocks within a similar supporting lip 107 which is secured to a supporting plate 108.

The hopper 100 is supported at a relatively elevated point by a bracket 109, which maintains the rearward wall 110 of the hopper in predetermined spaced relation with respect to an aluminum container 111. The latter contains certain switches, electromagnets and circuitry, hereinafter to be described.

In the exterior of wall 110 may be provided a recess 112. The hoppers 100 are employed in multiple, and certain of the hoppers include recesses 112, while others do not. The hoppers are adapted to hold two different component sizes. Components of one size are always stored in hoppers which include recesses 112, and those of the other size are always stored in hoppers which do not include recesses 112. Positioned immediately under each recess position, and secured within container 111, is a switch 113. An actuator 114 for switch 113 protrudes through a wall of container 111. If actuator 114 finds a recess (Figure 15) it is not depressed. If not (Figure 17), it is depressed by wall 110. Accordingly, circuits are differentially prepared in accordance with the character of the components in the hopper, to signal the character of the components. The circuits are utilized, in manner hereinafter described, to condition a stapling and forming head to handle the specific component types, taking account of differences in characters of the latter.

Components are released from the hopper 100 in response to energization of an electromagnet 115. To this end, an armature 116 is secured at its upper end, by means of a rivet 117, or the like, to the outside surface of wall 110. The armature 116 is fabricated of thin resilient steel strip, and normally lies flat against wall 110. When electromagnet 115 is energized the steel strip armature 116 is attracted to the electromagnet. When the latter is de-energized the armature returns to its unactuated position, in response to its own resilience.

The armature 116 includes two sets of perpendicular fingers 120 and 121, the latter pair extending directly from the lower end of armature 116 into the channel 105 in the direction of panel 104, while the former pair is secured to supports 112, extending from armature 116, and extend rearwardly into channel 105 toward wall 110.

The fingers 121 lie beneath the fingers 120, and parallel thereto. The pairs of fingers, extending in opposite directions, have ends subsisting in a common line, at least approximately, and are each sufficiently long to extend completely across the thickness of channel 105. The fingers 121 lie beneath the fingers 120 by a distance appreciably greater than the thickness of leads 103. The spacing between fingers of each pair allows these to support the leads 103.

As the armature 116 passes to either extreme limit of its motion, the fingers 120, 121 extend in succession unto the channel 105. As the fingers 120 recede, the component which is supported on the fingers 120 drops to the fingers 121. As the fingers 121 recede the component on the fingers 121 drops out of the hopper. Hence, each energization of electromagnet 115 results in delivery of one and only one component.

The components drop from the several hoppers 100, 100a, 100b, etc., which extend in a single line, into a V-shaped channel 130, extending parallel to and under the hopper outlets. The components lie, when dropped, in the bottom, 131, of the V-shaped channel 130. An air conduit 132 is provided from which extend a large number of ports, 133, into the base 131 of the V-shaped channel. The several ports 133 slope upwardly, in the direction of desired travel of the components. The latter are blown along the base of the channel by air blasts produced by ports 132 in response to air under pressure continuously supplied to channel 130.

At the delivery end of the channel 130 is a forming and stapling head (Figures 20–23, inclusive).

Forming and stapling

Components 101 are delivered one by one to the delivery end of channel 130. As each component is delivered it is stapled to the wafer apertures then available and properly positioned. Each component reaches the delivery end of channel 130 with considerable velocity. The inertial energy of the component causes the latter to pass over forming jaws 150, 151. In the process the advanced end of the component drops, while the rearward position is still supported by the conveyor. The forward lead eventually impinges on a cam surface CS, which raises the forward lead in response to the inertia of the component, and levels the component. The component is substantially level when it passes completely from the conveyor, causing same to drop flat in process of sliding off cam CS and onto the forming jaws 150, 151. The latter, for the purpose of receiving the component, come together in a V, an apex 154 of which is formed in one of the jaws, 151, only. Accordingly, the component 101 is supported in one of the jaws, 151, the other jaw 150 serving to guide the component to the apex 154, and to assist in mechanically supporting the jaw 151. The apex 154 lies below the level of the base 131 of V-shaped channel 130, and the end wall of the latter, together with stop 152, serve to center the component longitudinally, with considerable accuracy, with respect to the staple forming and inserting mechanism.

The two jaws 150, 151 are rigidly held together. The jaw 151 is pivoted on a pin 155, while the jaw 150 is pivoted on a similar pin 156. A lever arm 157 is secured to jaw 151, extending toward pin 156 and terminating in a pin 158. A similar lever arm 159 is secured to jaw 150 and extends toward pin 155, terminating in an end slot 160. The end slot 160 engages the pin 158. Accordingly, the jaws 150 and 151 are constrained to pivot in synchronism and together on the pins 155, 156, respectively, and neither can move without the other.

The jaw 151 is normally locked. To this end, a pin 162 is provided on jaw 151, and a camming slot 163, in a camming plate 164, engages the pin 162. The camming plate 164 is pivotably secured on a stationary pin 165 secured to a convenient portion of the frame of the machine.

The camming plate 165 supports, inwardly of jaw 151, a cam roller 167, and is spring biased into the position illustrated in Figure 20 by a spring 168. Sufficient downward pressure on cam roller 167 will therefore swing the plate 165 counterclockwise, while release of such pressure will permit return of the plate 164.

The cam slot 163 contains essentially two differently directed slot elements. One element, 170, extends arcuately at an angle of substantially 80°, or slightly less than 90°, to the horizontal, the arc centered on the axis of pin 165. The remaining element 171 extends at an angle of substantially 30° to the horizontal, and may be linear.

The pin 162 normally rests within the element 170, below the knee 172 formed in member 164 by the junction of slot elements 170, 171, and is horizontally aligned with pin 165. The parts described are so oriented and proportioned that downward pressure applied at apex 154 of jaw 151, tending to rotate jaw 151 to open position, forces pin 162 against one side of slot element 162, on a line with the axis of pin 165. The applied force is thus transmitted through plate 164 to pin 165, which is rigid, and is located in alignment with the force. Accordingly, no downward motion of point 154, consequent on counterclockwise rotation of jaw 151, is possible for this orientation of plate 164.

Figure 22:
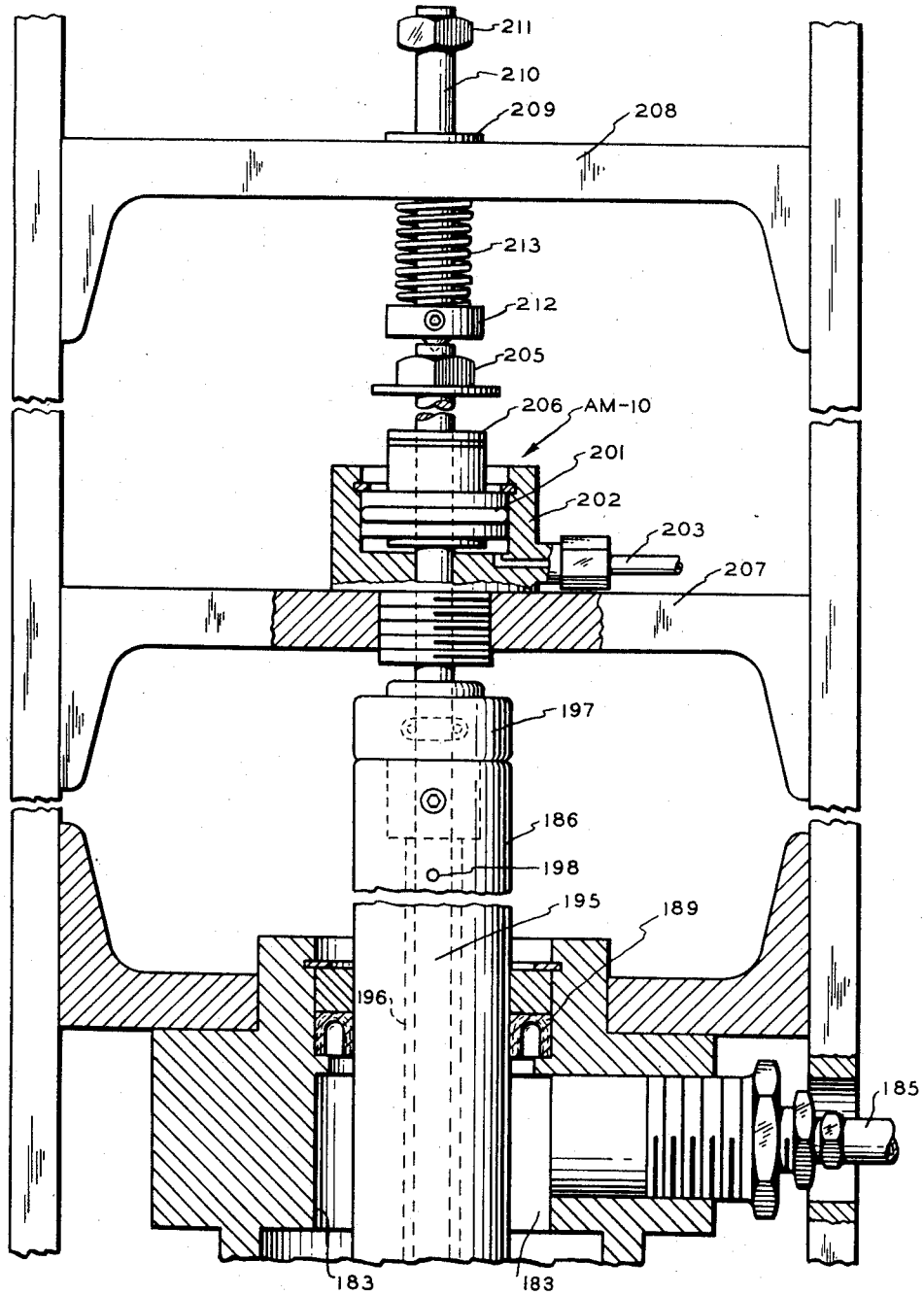
Figure 22 illustrates in section actuating and adjusting elements for the forming and stapling head of Figures 20 and 21.

When, however, downward force is applied to cam roller 167, the member 164 pivots sufficiently to enable pin 162 to ride over knee 172, and into slot element 171. That slot element is so oriented that pin 162 moves freely therein. No further restraining force is then exerted by plate 164 on pin 162. In fact downward pressure applied to cam roller 167 tends to move pin 162 along slot 171. Jaw 151 now swings freely, forcing jaw 150 into a complementary motion. The jaws then separate rapidly (Figure 22). On release of cam roller 167 the spring 168 brings member 164 up, relocking the jaws 150, 151.

In forming and stapling a component, the operations required are:

(1) To clamp the component leads against the forming jaw 151, (2) To bend the leads over the forming jaw, at right angles to their original directions, (3) To remove the forming block, (4) To carry the staple down to its wafer, and to insert the bent lead ends in apertures provided in the wafer, (5) To position the component properly vertically with respect to the wafer, (6) To hold the component steady while the lead ends protruding beyond the wafer are bent under and soldered.

Initially, the component leads 103 are supported on the notch 154, in jaw 151. The body 102 hangs freely in a recess 175 in the jaws. This body is fragile, and the leads 103 must therefore be subjected to no unnecessary bending or turning forces at any points thereof which are adjacent to the body.

The operation of holding the leads 103 firmly, preparatory to staple forming is performed by the holder head 176. The latter includes a pair of pressure elements, 177, separated by a recess 178 to provide clearance for body 102. The holder head 176 comes down with the forming fingers 179, and presses the leads 103 firmly against notch 154, to prevent any subsequent motion of the leads. The leads 103 are held at points adjacent the body 102 by pressure elements 177.

Thereafter, the forming fingers 179 continue to descend, while the holding head 176 remains stationary, and bend the ends of leads 103 about the vertical walls of jaw 151. The forming fingers 179 include a cam element 180, Figure 20, which actuates the cam roller 167 to effect separation of the jaws 150, 151. Accordingly, when the forming process is complete the jaws 150, 151 separate, and the fingers 179, with the bent component leads held frictionally therebetween, descends past the open jaws 150, 151 (Figure 21) down to the wafer.

When the forming fingers 179 have reached a position in proximity to wafer 10, the holder head 176 is forced downwardly with respect to fingers 179, sliding the component out from between the forming fingers 179, and forcing the formed ends into a pair of apertures 41, in wafer 10, which have been preliminarily suitably positioned to receive same. The downward motion of holder member 176 is automatically adjusted, at this time, in accordance with the thickness of the body 102, so that the latter will just lie flat against the wafer, and will not be either compressed, and thereby damaged, nor be spaced from the wafer, and hence not adequately supported.

The holder head then retains its final position until a heated anvil rises under the wafer, upsets the lead ends, and solders these to printed circuitry on the underside of the wafer.

Figure 23:
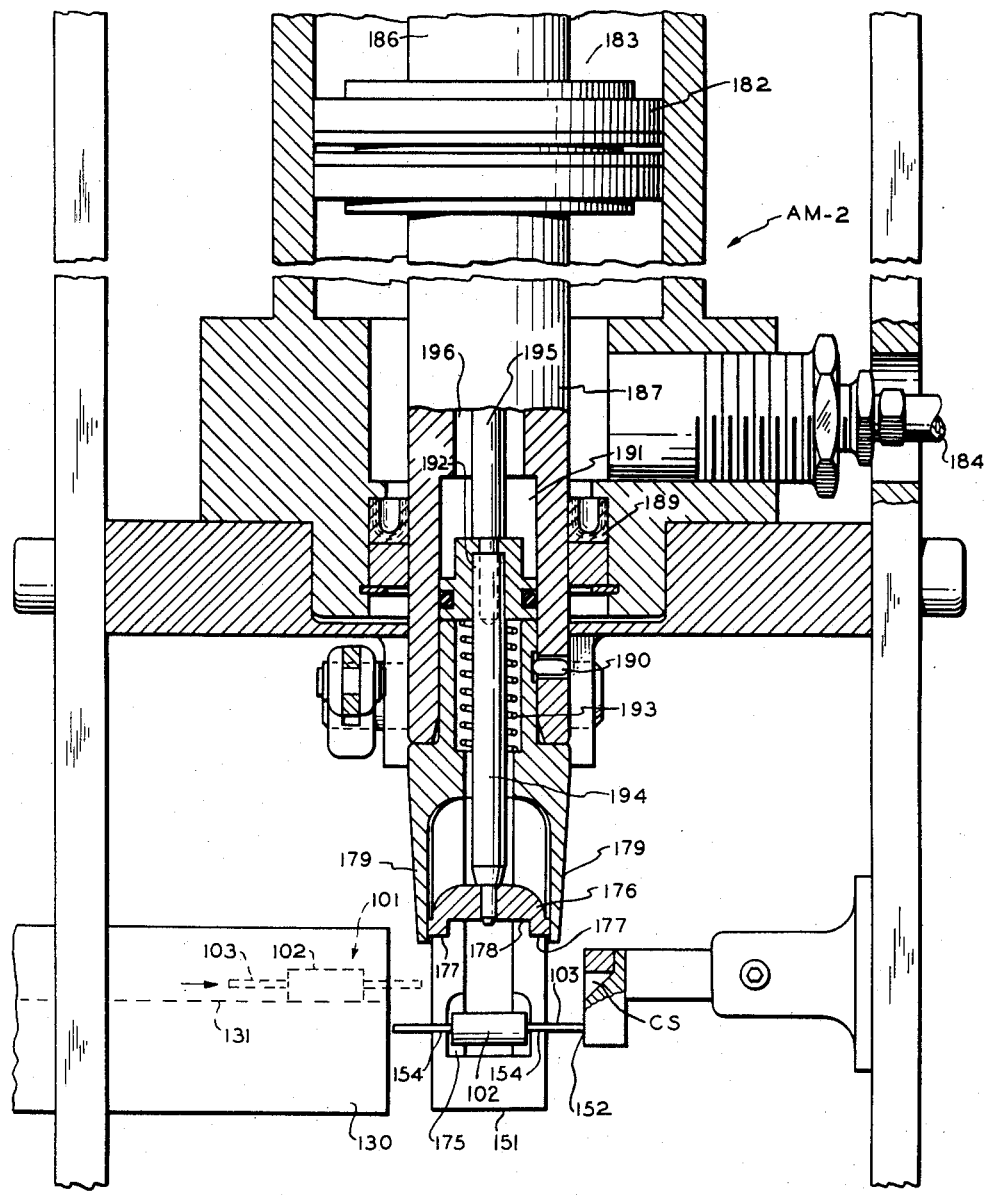
Figure 23 illustrates in section detail elements of the forming and stapling head.

The holding head 176 and forming fingers 179 are relatively translatable, but both are also actuatable together by means of pneumatic motor AM-2 (see Figure 23). The latter includes a piston 182, movable in a cylinder 183, and positively actuatable upwardly in response to pneumatic pressure supplied via a conduit 184, or downwardly in response to pneumatic pressure applied via a conduit 185. The piston 182 is secured immovably to an upwardly extending piston rod 186, and to a downwardly extending piston rod 187. Rods 186, 187 move through suitable sealing elements 189, such as O-rings, to maintain the pressure-wise integrity of cylinder 183. The forming fingers 179 are secured for movement with rod 187, as by means of a pin, or pins, 190.

A recess 191 is provided adjacent the lower end of rod 187, which provides a pneumatic cylinder for a piston 192, the latter having limited motion, and being normally biased upwardly by means of a helical spring 193. Extending downwardly from piston 192 is a rod 194, and extending upwardly is a rod 195, both rods being secured to piston 192 and actuated thereby.

The rod 195 further passes freely through a thickness variable pneumatically controlled spacer motor AM-10, having a piston 201, vertically movable in a cylinder 202. The piston 201 is normally in its downward position, but may be raised by a predetermined amount in response to pneumatic pressure supplied via conduit 203. The actual difference in thickness between the bodies of two specific electrical components may be of the order of .047". In such case the total motion of piston 201 may be predetermined to equal this same amount.

The upper end of rod 195 may be provided with an adjustment nut 205, which is stopped in its downward travel by an upwardly extending boss, 206, secured to piston 201. The maximum downward travel of rod 195 may be adjusted by adjustment of nut 205, and selected to have either of two values according to the position of boss 206. The motor AM-10 may be secured to a transverse beam 207.

A further beam 208 extends parallel to beam 207, and above it. A vertical rod 210 is vertically translatable with respect to and through a bearing 209 in beam 208, and is in alignment with rod 195. The rod 210 includes a stop nut 211 at its upper end, and a spring retaining flange 212 adjacent its lower end. A helical spring 213, extending between the under side of beam 208 and the flange 212, biases the rod 210 downwardly, with considerable force (about 40 pounds).

*Operation of forming and stapling head*

Figure 24:
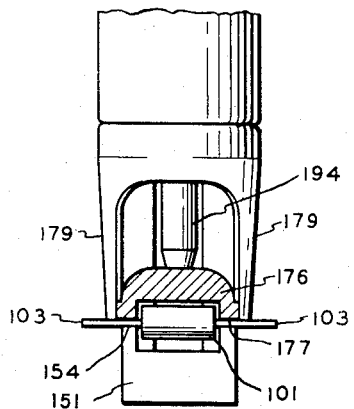
Figures 24 to 27 illustrate various positions of a stapling and inserting head in the course of forming and inserting an electrical component into a wafer.
Figure 25:
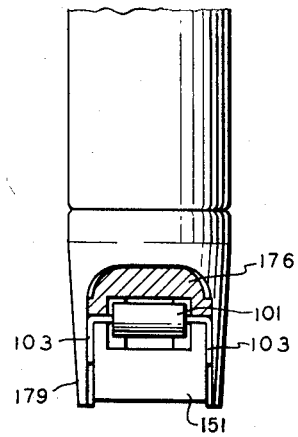
Figure 26:
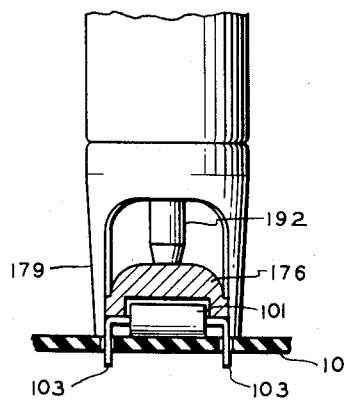
Figure 27:
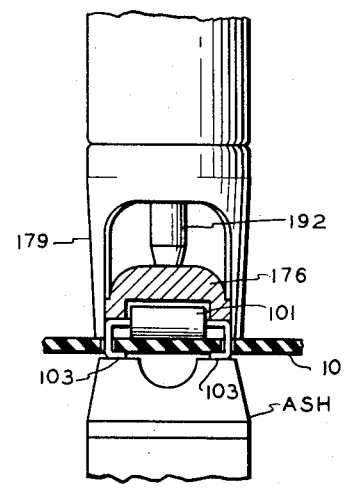
Figure 37:
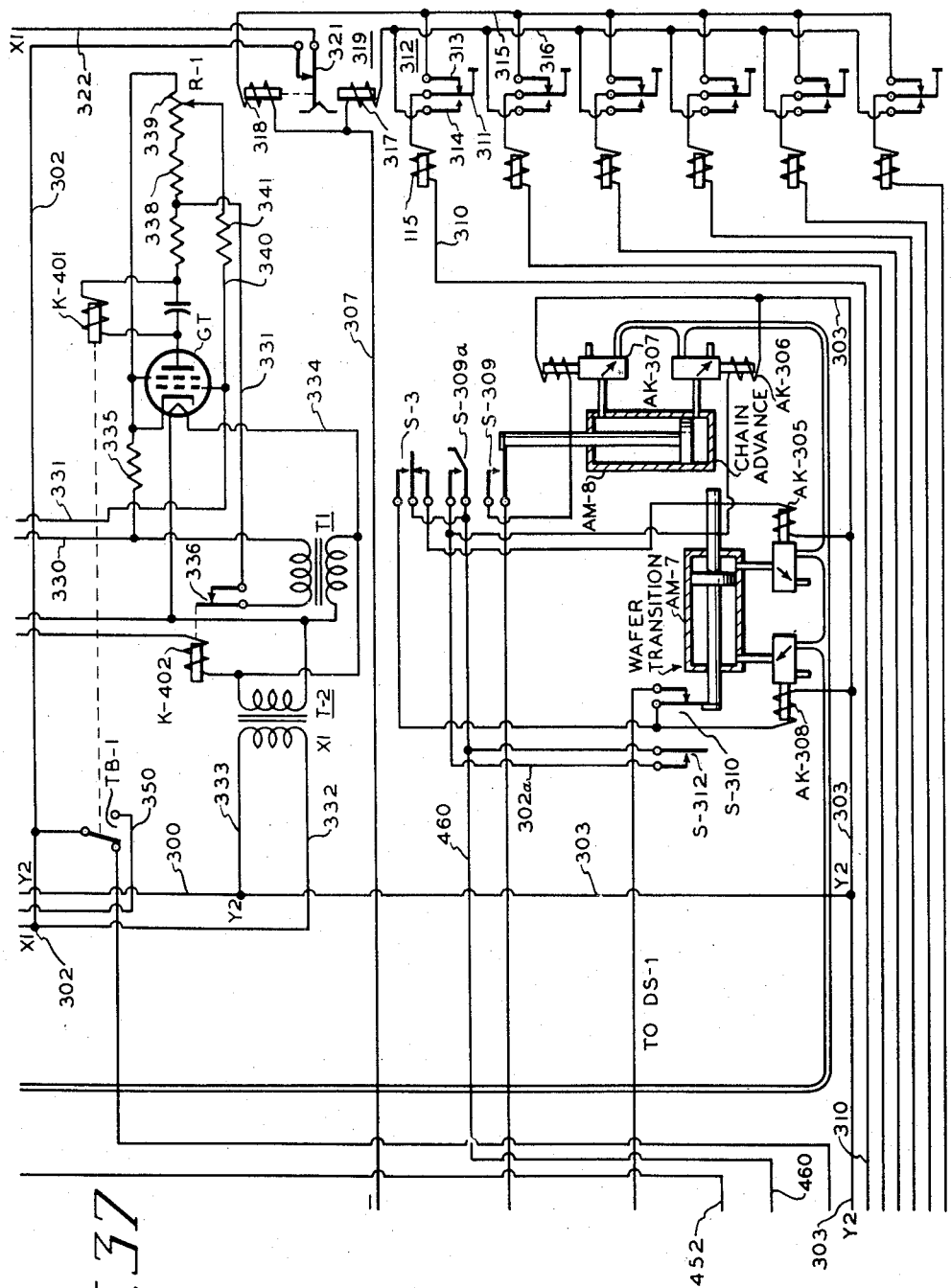
Figure 38:
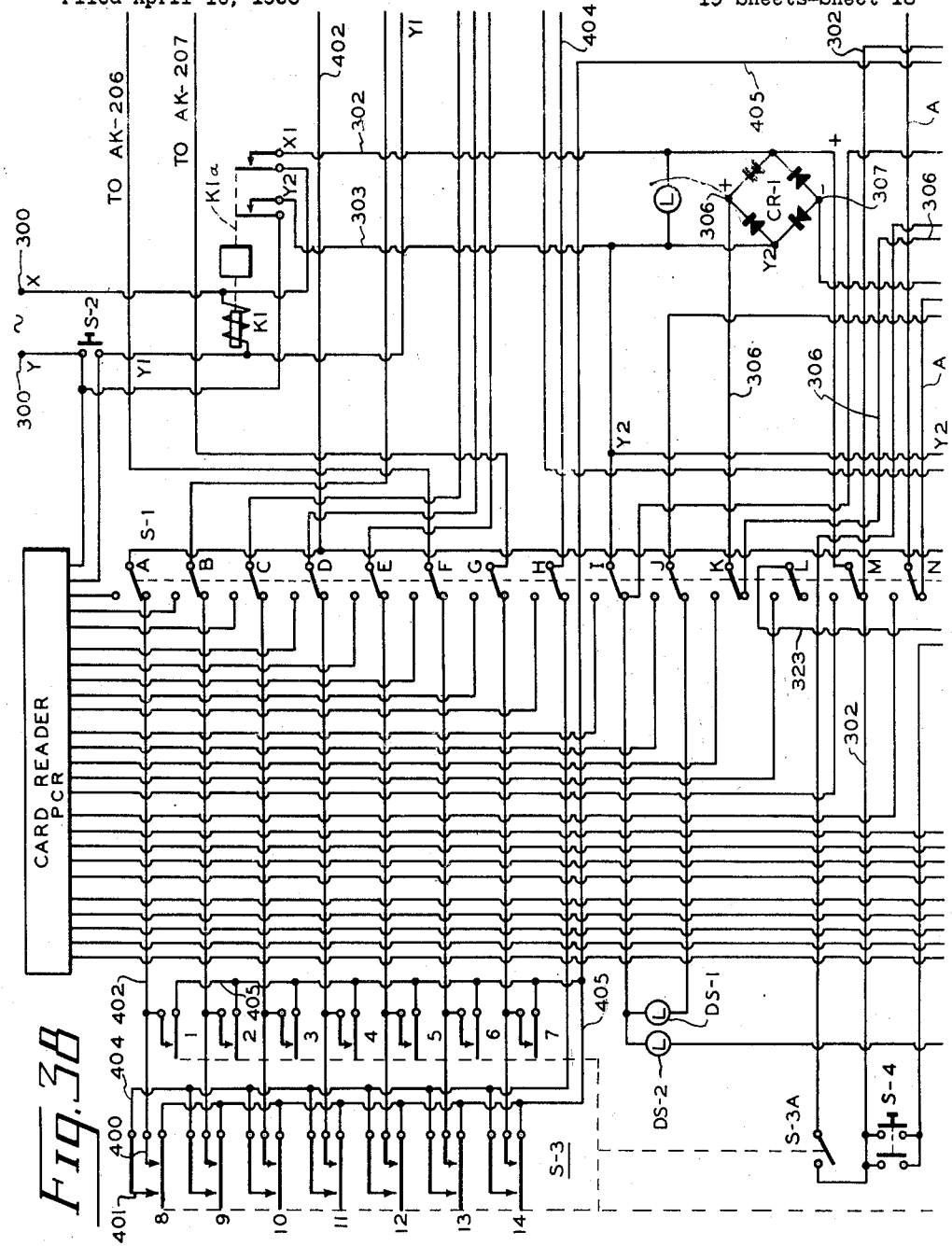
Figure 39:
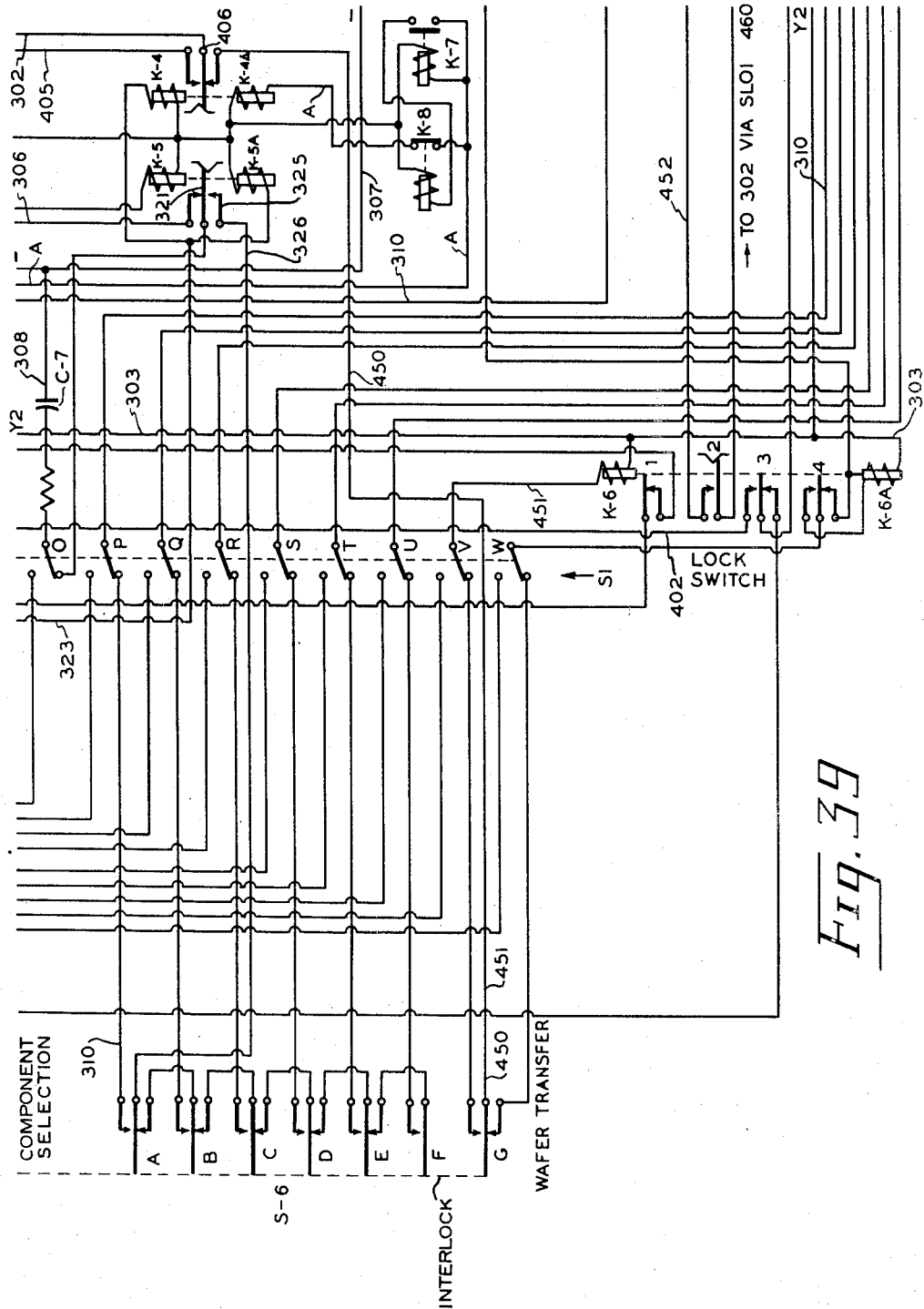

Describing now the operation of the forming and stapling head, the structural features of which have been hereinabove described in detail, pneumatic pressure is applied to the underside of piston 182, and exhausted from the upper side, raising the latter. This condition is illustrated in Figures 23 and 24.

The bias spring 213 is compressed, forcing piston 192 to its lower position against the force exerted by bias spring 193.

When pneumatic pressure is applied to the upper wall of piston 192, and exhausted from the lower, the piston 194 moves downwardly. The rod 210, impelled by spring 213, follows, retaining the holding member 176 and the forming fingers in their relative positions, as illustrated.

The holding member 176 clamps a pair of component leads against forming notch 154, and is stopped. The pressure exerted by the holding member 176 is then that exerted by the spring 213, essentially.

The forming fingers 179 continue downwardly, bending the ends of leads 103 at right angles, over the forming jaws 150, 151. When this operation is complete the forming jaws 150, 151 are cammed open, and the forming fingers 179, with the formed component retained therebetween frictionally, moves further.

At approximately the point in the cycle of operations at which forming begins the upper end of rod 195 disengages from rod 210, so that the holding member 176 may withdraw and does not force the component between the forming fingers 179. The latter are carried down to a position adjacent the wafer, previously positioned to accept the component. At this point in the motion of piston rod 186 the channel 198 moves within cylinder 183, and consequently supplies pneumatic pressure to piston 192. The channel 198 is a radial aperture which extends through the wall of rod 187, and hence joins cylinder 183 to cylinder 191. When channel 198 is in free atmosphere so is cylinder 191. When channel 198 is within cylinder 183, cylinder 191 is subject to the pressures of cylinder 183. The latter moves downwardly, forcing the component leads from between the forming fingers 179, and into engagement with the wafer. However, the maximum possible downward motion of the rod 195 is established by the stop 206, so that the extent to which the leads of the component are forced through the wafer apertures, and consequently the final position of the component body, is similarly thus determined.

The holder 176 retains its final position until the component leads are upset by a heated anvil ASH, which moves up under the wafer, bends the protruding lead ends under, and heats them sufficiently that they are soldered to the pre-tinned printed circuitry on the under side of the wafer.

*Wafer assembly*

In Figures 29–35, inclusive, the reference numeral 10 denotes a wafer formed of insulating material, on which may be mounted electrical components 251, of conventional types, such as are available commercially, as well as plug-in pins 252. The latter may be either male or female, or of composite type, as circumstances dictate. The wafer is provided with apertures 254 selected to conform to a predesigned lay-out of the components 251 and of the pins 252, and the components themselves may be resistors, condensers, vacuum tubes, transistors, coils and the like.

In Figure 28 the components 10 are illustrated as resistances of the type having cylindrical bodies and two leads 256, 257, extending co-axially with the bodies and in opposite directions. It will be realized, however, that the components may take various shapes and may be of various sizes, so that the requisite co-axially extending leads or terminals are provided.

On the other side of wafer 10, as illustrated in Figure 29, is provided printed circuitry, 258, which may be applied to the wafer 250 by any one of the presently known techniques, and which may be of any desired type. The printed circuitry 258 is arranged to interconnect certain of the apertures 254, thus eventually to interconnect selected pins 252 with selected terminals of components 10, and to interconnect selected terminals of components 251, in accordance with and as required by the electrical design of a specific sub-assembly. Since the specific interconnection plan forms no part of the present invention, details of the disclosure thereof is dispensed with.

A group of wafers may be intercoupled both electrically and mechanically. For the sake of example only a three wafer assembly, i.e. three sub-assemblies 259, 260, and 261, arranged in vertically superposed relation, the uppermost wafer 259, illustrated in plan in Figures 28, 29, and 30 may contain six male pins 263, each of which consists of a thin metallic element of circular cross-section about three-tenths of an inch long and about $\frac{1}{32}$ inch in diameter, terminated by a head of larger diameter. The apertures provided for the pins conform in size with the body portions of the pins, but do not pass the heads. To secure a pin to a wafer the body of the pin is passed through an aperture and the pin clipped to the wafer mechanically adjacent the wall of the wafer, thus securing a firm mechanical attachment. Machines for effecting the clipping operation are well known per se, and are available commercially, and accordingly further description of the clipping process is dispensed with.

The intermediate wafer is provided with combined male and female elements, the female elements 266 mating with the male elements 263 to interconnect the several wafers both mechanically and electrically. The lowermost wafer contains combined male and female elements, the female elements extending vertically upwardly to mate with downwardly extending male elements of the superposed wafer, and downwardly extending male elements designed to plug into a terminal board, chassis, or the like (not shown).

The electrode components utilized in fabrication of a subassembly are exemplified by resistance elements. Prior to attachment to a wafer each resistant element, as 251 of Figure 28, may consist of cylindrical body element, 255, and wire terminals 256 and 257, extending in opposite directions from opposite ends of the body element 255, co-axially therewith. In order to staple an element, as 251, to a wafer the wire terminals 256 and 257 are bent as at 256a and 257a, to extend at right angles with the body 255. When assembly or stapling is complete body 255 may rest directly on a wafer 250, or may be displaced very slightly therefrom, if desired, while the bent ends 256a, 257a protrude to the underside of the wafer. The protruding ends 256a, 257a, illustrated in Figure 34, are then upset from the underside of the wafer, as at 256b, 257b clamping the element firmly to the wafer. The lead ends 256b, 257b, are heated after being upset, causing solder, which is pre-tinned on the printed circuitry 258, and which may also be provided on the lead ends if desired, to fill the apertures 254, completing a mechanical connection of the components 255 to the wafer 250, as well as establishing a firm electrical connection between the lead ends 256b, 257b and the printed circuitry 258. It has been shown to be important to pre-tin the printed circuitry 258 to precise thickness and tolerance, in order to effect reliable soldering operations. This is most readily accomplished by electrically plating the solder on the printed circuitry.

It is essential, in high speed, mechanized soldering, to control accurately soldering time, soldering temperature, pressure and amount of solder employed. In the practice of the present invention rise of an anvil ASH heated to a temperature of 540° F., for a period of .4 second, is recommended, the solder having been previously electroplated to a thickness of 6 to 8 mils. When these values are employed not only is a reliable soldered joint consistently fabricated, but the electrical value of the soldered component is not disturbed.

*Description of control circuitry and brief description of overall system operation*

The reference numeral 300 identifies a source of A.-C. voltage, one side of which is connected with a relay coil K–1 directly, and the other side of which proceeds to the relay coil K–1 via a push-button switch S–2. When the switch S–2 is closed, the relay K–1 is energized, operating the step switch K1a. Alternate energization of coil K–1 alternately opens and closes the contacts of switch K1a. When closed the lines 302, 303 are supplied with A.-C. power. The lines 302, 303 are connected to a rectifier unit CR–1, and continue beyond, to supply A.-C. power to various instrumentalities of the system. The terminals 306, 307 of the rectifier 305 provide D.-C. power, respectively of positive and negative polarity.

*Component feed and insertion*

In the presently described embodiment of the invention, provision is made for the selection of any of six electrical components, stored in six different hoppers. Obviously, any desired number may be provided for. Selection of a desired component is accomplished by energizing a selected component hopper, each energization of a selected hopper resulting in delivery of the component type stored by that hopper, to a station at which the component is automatically stapled and soldered to a pre-wired and pre-tinned wafer. Component selection is accomplished by selective manual interlocked switches S–6, the several selection switches being identified by the letters A–F, inclusive. The position G of switches S–6 is retained to control wafer transfer, and the switch interlock feature assures that selection of any component, or initiation of wafer transfer, can take place selectively only, and one at a time, in that closure of any pair of contacts of switches S–6 is accompanied by opening of any contacts theretofore closed.

Preparatory to component selection, a condenser C–7 (Fig. 39) is charged from the D.-C. line. The charging circuit extends from negative line 307, via line 308, and via switch S–1–O, the now closed K–5 switch contacts, and back to positive line 306. When one of switches S–6A to S–6G is closed, it locks, unlocking any previously activated one of these switches. Assume switch S–6–A to be the selected switch. A circuit is then completed via line 310, via that one of component feed solenoids 115 which is responsive to switch S–6–A, and to the movable arm 311 of a two position switch 312, having stationary contacts 313, 314. The terminal 313 is connected to a line 315, and the terminal 314 to a line 316, so that either line 315 or line 316 is selected by two-position switch 312. The alternate positions of the latter are selected (by means of mechanism hereinbefore described) in accordance with the character of the hopper which stores the component involved, i.e. in one specific example of the system, in accordance with whether a ¼ watt, or a ½ watt resistor hopper is associated with switch S–6–A. The relays 115 serve to actuate the component feed gates of the system, each of which releases a single component, in response to an electrical impulse applied thereto by discharge of condenser C–7.

The line 316 is connected to one terminal of an unlatching coil 317, and the line 315 to one terminal of a latching coil 318 of a latching, two-position relay 319. The remaining terminals of coils 317, 318 are connected together and to line 307, which is the negative D.-C. line. Accordingly, the position of switch 312, which selects one of lines 315, 316, determines the position of armature 321 of latching relay 319, and therefore whether a line 322 will be connected to a power line 302, or not. The condition of line 322, i.e. energized or not, controls an adjustment of a stapling head of the system, so that it may effectively staple the type of component delivered, keeping in mind that the bodies of electrical components of different sizes are of different diameters, and that it is desired to staple each component into the same precise proximity with a wafer, so that allowance must be made for component diameter in establishing proper operation of the stapling head.

Having selected switch S–6–A, the switch S–4 is manually closed. This action connects power line 302 to a lead 323, which supplies power to coil K–5–A, throwing the associated switch armature 321 to the contact 325, and completing a circuit from the positive side of condenser C–7, through contact 325, and back via line 326 to line 310. The condenser C–7 then discharges through coil 115, which causes the appropriate component to drop from its hopper for delivery to stapling head, and also through the appropriate one of relay coils 317, 318 which, by activating armature 321 to one of its two possible positions, conditions the stapling head for the size of component involved.

It will be clear that selection of any one of switches S–6A—S–6F will in a manner similar to that above described, result in dropping of a component from the corresponding hopper and in adjustment of the stapling head, so that it may effectively staple components of the particular size stored in the selected hopper.

The selected component drops on the air slide AS, which immediately and automatically conveys the component to a stapling station. At the latter is located a photo-cell PC and a light source LS. The latter normally maintains the former illuminated. The cathode of the photo-cell PC is connected via lead 330 to the cathode side of a tetrode gas tube or thyratron GT. The anode of the photo-cell PC is connected via lead 331 to the control grid of the tube GT. The A.C. lines 302, 303 are connected, via leads 332, 333, to the primary side of a transformer T–2. One terminal of the secondary side is connected to the heating filament of gaseous tetrode GT via lines 334. The secondary winding of transformer T–2 is connected to the primary winding of a further transformer T–1, the secondary winding of which is connected at one terminal to the cathode of tetrode GT via a voltage dropping resistance 335, and at the remaining terminal via switch contacts 336, and via relay coil K–401 to the anode of the gaseous tetrode GT. From the contacts 336 a lead 337 proceeds to dropping resistance 338, and thence via voltage divider resistance 339 to the cathode of tetrode GT. The control electrode of tetrode GT is connected via lead 340 to the variable tap of resistance 339, via resistance 341. The photo-cell PC is then connected at its anode directly to the control grid of tetrode GT, and at its cathode directly to the low potential terminal of resistance 335. The cathode of tetrode GT is, when its anode is positive, above the potential of the cathode of photo-cell PC, by virtue of the voltage drop across resistance 335. The photo-cell PC, when illuminated and conductive, introduces a voltage drop at resistance 338, which reduces the A.C. control grid voltage below that of the cathode of tetrode GT. The tetrode GT is thus maintained non-conductive, even while its anode is positive. When photo-cell PC is unilluminated, and hence non-conductive, the A.C. potential on the control grid of tetrode GT is not depressed, and the tetrode GT becomes conductive during positive half cycles of voltage applied to its anode.

So long as the photo-cell remains illuminated the tube GT remains non-conductive, then, and the relay K–401 unenergized. When the selected component arrives at its position at the component forming and insertion head, or stapling head, as it is sometimes denoted herein, the photo-cell illumination ceases, the tetrode GT becomes conductive, and relay K–401 is energized. Its contact then pulls up, applying A.-C. power from line 302 to lead 350, and thence to the normally closed contacts of switch S–302, and thence on lead 350a to solenoid controlled pneumatic valve AK–304 and back to line 303. The normally withdrawn insertion head motor AM–2 is now actuated downwardly.

While the insertion head IH is in its uppermost position, a cam 354, located on the piston rod thereof, maintains a switch 304 in open condition. After the head travels downwardly a short distance, the switch S–304 closes, preparing a circuit for normally open switch S–303. When the head IH has traveled downwardly through its entire stroke and completed its staple forming and insertion function, the cam 354 closes switch S–303 completing a circuit for solenoid controlled pneumatic valve AK–302. The circuit for the latter proceeds from line 303, via leads 355, switch S–304, switch S–303, and back to lead 302.

Operation of solenoid operated valve AK–302 provides pneumatic pressure to pneumatic motor AM–3 which actuates the anvil and soldering head ASH upwardly. A heating circuit for the latter is provided directly between leads 302 and 303, 356 being the heating coil. As the anvil and soldering head ASH starts to move upward, it breaks a circuit at switch S–301 from the lead 302.

When the anvil and soldering head ASH has completed its travel, at which point it impinges against a stop, pressure on the under chamber of pneumatic motor AM–3 builds up sufficiently to actuate pressure responsive switch S–302. The latter completes a circuit from lead 350 to lead 356 breaking the circuit to lead 350a. The latter operation breaks the circuit to solenoid operated valve AK304, causing the insertion head IH to rise by introducing air pressure to the underside of motor AM–2. As the latter rises to its uppermost position cam 354 opens cam switch S303, which breaks the circuit between line 302 and line 355, via switch S304, which in turn de-energizes solenoid activated valve AK302, and causes the motor AM2 to withdraw the anvil soldering head ASH. When the insertion head IH has risen, photo-cell PC becomes illuminated again, the tetrode GT becomes non-conductive, relay K401 becomes de-energized, and its switch is thrown to break the circuit between leads 302 and 350, and to make a circuit between lead 302 and pilot light DS–2.

The conditions of pilot lights DS–1 and DS–2 signal to the operator when an operation is in process, and when it has been completed. Only after completion may the closed one of switches S–6 be actuated to select a further component.

The process of bending over the lead ends 103 in the course of a stapling operation, requires that the component be held with considerable force against upward movement. This force is provided by the holding member 176 (Figures 24–27), which is at this point in the cycle of operations pneumatically impelled downwardly, but positioned in its farthest point of travel by stop 206 (Figure 22). The anvil ASH also moves against a stop, or has a limit of travel, at which staple forming is complete. Thereafter, pneumatic pressure builds up further in the under side of the cylinder of anvil motor AM–3, until sufficient pneumatic pressure exists to operate pressure switch S–302. This process introduces a predetermined time lag. Operation of switch S–302 controls insertion head motor AM–2, which rises. The anvil, ASH, remains however in its uppermost position until the insertion head has completely risen, throwing switches S–304 and S–303 to their original or unactivated positions, and exposing the photo-cell PC to light from source LS. Opening of switch S–304 permits the anvil to retract. During the period of rise of the insertion head IH the sole back pressure on the anvil is that provided by its stop, and it is during this period of rise that soldering is completed. The time of rise may be adjusted to provide proper dwell time for the soldering head ASH, and thus controls soldering time. Thereafter, i.e. when photo-cell is again illuminated, the anvil ASH retracts. Complete retraction of anvil ASH is signaled by re-closure of switch S–301, which closes a circuit from line 302, to relays K–7 and K–4–A. The relay K–7 pulls over, and completes a circuit for relay K–8, which breaks the circuit to relay coil K–4–A. Relay coil K–4–A is an unlatching coil, for armature 406, and the function of relays K–7, K–8 is, therefore, to pulse relay K–4–A, or to assure that it will be de-energized shortly after it has been energized, thus preventing oscillation, or repeated operation.

A reset pulse for relay K–5 is provided on closure of switch S–3–A, which is momentarily actuated in response to actuation of any of wafer selection switches S–3. Reset operation of relay K–5, by resetting armature 321, closes the charging circuit for condenser C–7, preparatory to a further component selection. This sequence provides a protective interlock for preventing more than a single component feed for any wafer position selection.

Wafer position selection

For each selection of a component, as by actuation of a selected one of switches S–6A to F, inclusive, it is necessary to select a wafer position, which is accomplished by selection of one of switches S–3–1 to 14, inclusive. The possible wafer positions are arranged in two longitudinally extending parallel lines, having seven positions in each line, the lines displaced laterally from each other. The wafer selection switches are correspondingly placed, and are interconnected in pairs. The upper ones of switches S–3–1 to S–3–7, inclusive, select the seven longitudinal positions. Each lower switch includes one contact 400, which parallels the contacts of the corresponding upper switch; and an additional contact 401, which signals that a lateral displacement of the wafer is required.

Consider now the upper row of switches S–3–1 to S–3–7, inclusive, and particularly the switch S–3–1. The latter, at one contact is connected with wafer positioning solenoid controlled pneumatic valve AK201, over lead 402, and thence to power lead 303. The remaining switch contact is connected to a common lead 405, to open contact of relay K–4. Relay coil K–4 is connected in parallel with relay coil K–5a, so that on closure of manual switch S–4 relay coil K–4 and K–5a are energized, armature 406 completing a circuit between line 302 and 405. Operation of valve AK201 causes the piston of positioning servo AM–1 to assume a position corresponding to the selected valve AK–201. The lateral shift valve AM–5 is not operated at this time, since completion of its circuit depends on completion of a circuit from lead 404 through solenoid 407 of valve AK208, and via lead 408, which connects with A.-C. line 303, and via the contacts 401 of switch S–3, back to lead 405, which connects with A.-C. line 302, through the contacts of relay K–4. Hence valve AK208 operates only if one of switches S–3–8 to S–3–14 is operated.

The shift motor AM–5 is spring biassed to its unactuated position, so that only while one of switches S–3–8 to S–3–14 is closed is the shift motor actuated.

Lock motor (pneumatic) AM–4 is normally energized and its locking plunger rod is accordingly normally pressed downwardly by air pressure controlled by solenoid controlled pneumatic valve AK209. The circuit for the solenoid of valve AK–209 may be traced from power lead 303, back through lead 410, normally closed switch S–201 and back to line 302. When air is exhausted from any of the exhaust lines EL deriving from the pneumatic servo-motor AM–1, the switch S201 is opened by the pressure of the exhaust gases. The lock solenoid is then de-energized, removing air from lock motor AM–4 and permitting the pin 71 to rise in response to force exerted by spring 69. Once a positioning operation has been completed, exhaust of gases ceases because the previously opened exhaust line EL is closed by the piston of motor AM–1. The switch S201 then closes again, and the locking pin moves downwardly to lock the wafer positioning carriage 35.

By selecting different ones of the switches S–3–1 to S–3–7, inclusive, or S–3–8 to S–3–14, inclusive, different ones of the positioning valves K–201 to K–207 are activated, but in each case the operation is the same. If, however, one of switches S3–8 to S3–14, inclusive, is operated, the additional operation takes place that lateral shift motor AM–5 is actuated, shifting the wafer carriage laterally.

Wafer transfer

The name "Wafer Transfer" is given to the operation which transfers a wafer from the wafer chain conveyor to the wafer positioning carriage. Wafer transfer is signaled by the switch S–6–G. Actuation of this switch throws all of component selection switches S–6A to F to unactuated position, the switch S–6 being mechanically arranged to permit only one of its sets of contacts to be actuated at any one time. Switches of this character are available on the open market and therefore need not be described or illustrated in detail. The movable element of the switch S–6–G is connected via 450 and normally closed contacts of lock-switch K–4, K–4A to power lead 302. Switch S–6–G serves to connect lead 451 to lead 450, which proceeds to relay coil K–6, and to power lead 303. The armatures of switches K–6–1 to K–6–4 are moved to the left, and locked, when relay coil K–6 is energized. The now active contact of switch K–6–2 is connected via lead 452, through S–308, which is closed in only the #1 position of the carriage. Hence, so long as the wafer positioning carriage is not in position #1, so that switch S–308 is open, the wafer transition circuit is open and wafer transition is prevented. The #1 position of the carriage is the one position assumed by the carriage at which wafer transfer is possible, and devices are provided, which are hereinafter described, to effect return of the carriage to #1 position whenever wafer transfer is requested by actuation of switch S–6–G.

Further, in order to permit transfer of a wafer from the chain conveyor into its carriage, the wafer carriage must be brought to the standard position. The standard position is that which obtains when switch S–3–1 is selected. Accordingly, lead 402 is extended to switch K–6–3 so that the latter and S–3–1 are in parallel, and when switch K–6–3 is actuated the carriage moves to the standard position.

The chain advance motor is AM–8, which is controlled by solenoid responsive valves AK–306 and AK–307, the latter, when activated causing the motor AM–8 to retract, and the former causing the motor AM–8 to advance. Initially, the motor AM–8 is in retracted position, as illustrated. The wafer transfer motor AM–7 is, on the contrary, normally in advanced position, i.e. in the position it assumes to insert a wafer in the carriage and from which it may abstract an assembled wafer. When switch S–6–G is closed, then, the required sequence of operations is:

(1) Retraction of transfer motor AM–7, which abstracts an assembled wafer from the wafer carriage and deposits same on the chain for ultimate movement to an unloading point;

(2) Chain feed by motor AM–8, to an extent sufficient to place a succeeding wafer in position before the carriage;

(3) Advance of motor AM–7 to transfer the succeeding wafer from the chain into the carriage.

Insertion of a first component is accompanied by return of the chain advance motor AM–7 into ready position for a further advance.

Switch contacts K–6–2, when closed by coil K–6, connect a lead 460, via normally closed contacts of a switch S–311, to the solenoid of valve AK–305. The solenoid of valve AK–308 is at this time in de-energized state, and its valve consequently in exhaust position. The wafer transfer motor AM–7 accordingly retracts, removing a wafer from the carriage and depositing same on the chain conveyor. Normally closed switch S–310 is opened, responsive to the initial movement of motor AM–7. Switch S–312 is closed when the motor AM–7 completes its travel. This closure signals completion of removal of a wafer from the positioning carriage, and of deposit of an assembled wafer on the chain. A power circuit is now completed, by switch S–312 between leads 460 and 303, for the solenoid of valve AK–306. The chain advance motor AM–8 is actuated, in response, a sufficient distance to provide a new wafer at loading position. In the course of travel of the piston of chain advance motor AM-8 to load a wafer on the carriage the following events occur in sequence:

(1) Switch S-309 is closed;
(2) Switch S-309a is closed; and
(3) Switch S-311 is operated to open one of its sets of contacts and close the other.

One contact of switch S-309 now proceeds to a now open circuit, at switch K-6-4. Switch S-309a provides a direct connection between lead 303 and lead 460 for solenoid AK-306, by-passing switch S-312, and at the end of the stroke switch S-311 is actuated, which closes the previously open circuit to valve AK-308, and opens the previously closed circuit to valve AK-305. The wafer transfer motor AM-7 now feeds forward transferring a new wafer to the wafer positioning carriage. As the motor AM-7 advances it opens the switch S-312, at the beginning of its advance, and closes the switch S-310 at the end of its advance. Switch S-310, when closed, energizes pilot light DS-1. The wafer transition motor AM-7 remains in its advanced position, thereafter, until the wafer is completely assembled and is required to be removed. It will be recalled that the jaws of the wafer transition open automatically, after they have advanced sufficiently to deposit a wafer in its holder, thus permitting wafer-carriage positioning without interference from the wafer transfer devices.

The process of component insertion and of wafer positioning may now be proceeded with, in accordance with the description hereinabove provided. On depression of the first one of component selection switches S-6-A to F, inclusive, the transfer switch S-6-G is actuated to its original position, which de-energizes coil K-6 and energizes coil K-6A. Contacts K-6-4 are actuated thereby, which energizes valve AK-307 through switch S-309, now closed, and de-energizes valve AK-306, retracting the chain advance motor AM-8. The precise degree of motion required is imparted to the chain by a pawl, actuated by the motor AM-8 to drive a link of the chain directly, and which impinges on a stop to terminate the chain driving stroke. When the motor AM-8 has completed its return stroke, the switch S-309 opens, removing power from solenoid AK-307.

*Lead thickness compensation*

The problem which arises in connection with the stapling of components of different sizes has been described hereinbefore. To recapitulate briefly, the insertion head is required to clamp, bend and insert the components, for certain variations of body thickness. It has been found that variations of body thickness do not noticeably affect the operation of the system, except in respect to insertion. Since the components are secured by their leads, and moved in response to force applied to the leads, in the insertion mechanism, if all components were moved toward the wafers until their leads were the same height above the wafers, it would follow that if the thinner bodied components were positioned precisely in contact with the wafers, the thicker bodied components would be crushed, while if the thicker bodied components were properly placed, the thinner bodied ones would not be in sufficient proximity to the wafers. For this reason it is necessary to adjust the insertion mechanism for the size of components being inserted. The lowermost point to which the holding member 176 of the insertion head may move is determined by the location of a stop 205 on the piston rod 195 of the insertion head, i.e. pneumatic pressure drives the holding member 176 toward the wafer until the piston rod is stopped. (See Figure 22.) The stop is made adjustable, in accordance with the present invention, by utilizing the two-position pneumatic motor AM-10 as the stopping element. The motor is controlled by a solenoid activated pneumatic valve AK-303. The solenoid of valve AK-303 is controlled by the positions of the switch arm 321, hereinabove described, i.e. in one position of switch arm 321 power is transferred from lead 302, to lead 322, to energize solenoid operated valve AK-303. In the alternate position the switch is open and power is not transferred.

A series of switches S-1-A to W is employed in order to transfer control of the system from the manual switches S-6, S-3 and S-4 to a punched card reading device which automatically supplies signals to the system. It will be noted in this respect that each lead which is connected to the contacts of the several manually controlled switches, is also connected to punched card reader device PCR, for which may be substituted any desired remote control unit capable of supplying electrical control signals in required sequence to the control leads.

A preferred form of punched card reading device employable to control the operation of a system in accordance with the present invention is described and illustrated in an application for U.S. patent filed in the name of Bernd Vosson, entitled Card Reader, Serial No. 627,036, filed December 7, 1956 and assigned to the assignee of the present application. Nevertheless, any device capable of providing the required electrical signals to the system may be employed in the system, and more specifically the device employed need not be a punched card read-out device, but may supply programming signals derived from magnetic tape, punched tape, manually operated switches, or any equivalent device known in the art.

While we have described and illustrated one specific embodiment of the present invention, it will become apparent that variations of the specific details of construction may be resorted to without departing from the true spirit and scope of the invention as defined in the appended claims.

What we claim is:

1. A system for automatically fabricating electrical assemblies, each sub-assembly comprising a wafer having secured thereto at least one electrical component having leads, said system including means for abstracting wafers from a stack of wafers, a wafer conveyor, means for securing said wafers in longitudinal array on said conveyor, means for actuating said wafer conveyor in discrete steps to a component insertion position, means for transferring said wafers from said conveyor one at a time to a wafer positioning holder, means for positioning said wafer positioning holder in sequence in a plurality of positions with respect to said insertion position, means for supplying components to said insertion position, means for sensing the arrival of one of said components at said insertion position, a component lead forming and insertion device at said insertion position, means responsive to said sensing for actuating said component lead forming and insertion device, said component lead forming and insertion device arranged when actuated to form the leads of an electrical component as staple elements, and for inserting the staple elements so formed into said wafer.

2. A pneumatically operated system for fabricating electrical sub-assemblies, each comprising a wafer having secured thereto a plurality of electrical components, each of said components including a relatively fragile body and two oppositely extending wire leads, said wafer having a plurality of aperture pairs at discrete positions of said wafer, means for supplying at will a preselected one of a plurality of components of different character, an electrically controlled multiple position pneumatic servo-motor for controlling the energized condition of control circuits, a pneumatic conveyor, means responsive to energization of each selected one of said control circuits for depositing a predetermined one of said components in said pneumatic conveyor, said pneumatic conveyor having air jets arranged for impelling said components to a staple forming and inserting position, a staple forming and inserting head located at said position and arranged to form said wire leads as staple elements and for inserting said staple elements through said wafer.

3. A system for automatically fabricating electrical sub-assemblies, each sub-assembly including a plurality of electrical components stapled in predetermined positions of a wafer, comprising a plurality of hoppers each containing a supply of said components of one specific character, each of said components including a body and a pair of oppositely directed leads, a wafer positioning mechanism comprising means for selectively positioning wafers in any one of a plurality of component receiving positions, means for stapling a component of any one of said specific characters to said wafer by means of said leads as staple elements while said wafer is in said component receiving position, an electrically controlled gate associated with each of said hoppers for releasing one of the components contained therein in response to a discrete electrical impulse, said means for stapling including a staple forming and inserting mechanism, means for feeding any component released by any one of said hoppers to said staple forming and inserting mechanism, means for actuating said staple forming and inserting mechanism, component circuit selecting devices and wafer position selecting devices, and means for coordinating in a predetermined time sequence the operation of said component forming and inserting mechanism, said component circuit selecting devices and said wafer position selecting devices.

4. The combination in accordance with claim 3 wherein is provided interlock means for preventing selection of more than a single component and of more than a single component receiving position.

5. The combination in accordance with claim 3 wherein is provided an electrically controlled pneumatic servo system for selecting said component receiving positions.

6. The combination in accordance with claim 3 wherein is provided separate circuits operable when selectively energized for selecting each of said wafer positions and separate circuits operable when selectively energized for selecting one of said gates, and means for preventing selection of more than one gate and of more than one wafer position.

7. In a system for fabricating electrical subassemblies comprising pre-wired wafers to which are stapled electrical components, said components having each a pair of leads, said components being stapled by said leads as stape elements, a plurality of component hoppers, each containing a plurality of components of one character, a wafer supply device, a stapling station, means for at will feeding a component from any one of said hoppers to said stapling station means for transferring a wafer from said wafer supply device to said stapling station, and means for interlocking operation of said means for transferring and said means for at will feeding a component from any one of said hoppers so that operations of said last named two means are mutually exclusive, whereby one of said operations cannot occur until the other has been completed.

8. In a system for fabricating electrical subassemblies comprising pre-wired wafers to which are stapled electrical components having leads to be formed as staple elements, a component stapling device, means for feeding one of said component devices to said component stapling device, a photo-cell at said component stapling device, a light source at said component stapling device arranged normally to energize said photo-cell, said light source and photo-cell so located with respect to said component stapling device that presence of said component at said component stapling device interrupts said light, and means responsive to deenergization of said photo-cell for actuating said component stapling device to perform a component stapling operation on said leads.

9. In a system for fabricating electrical assemblies comprising pre-wired wafers to which are stapled electrical components, each of said components including a relatively fragile body and a pair of metallic leads extending from said relatively fragile body, a component lead forming and stapling device located at a component forming and stapling station, means for feeding said components to said station individually, a photo-cell device at one side of said station, a light source, means for modifying the illumination of said photo-cell by said light source in response to the presence of one of said components at said station whereby an electrical signal is generated by said photo-cell, means responsive to said electrical signal for actuating said component forming and stapling device to perform a forming and stapling operation on said leads means for positioning said each of said wafers in programmed relation to a plurality of component insertion positions, means for sensing completion of each wafer positioning operation, and means responsive to said sensing for initiating operation of said means for feeding said components.

10. In a system for fabricating electrical assemblies comprised of components having leads stapled to a circuit board by the leads as staple elements, a component lead stapling device, means for feeding one of said components to said component stapling device, a photo-cell located at said component stapling device, a light source located at said component stapling device and arranged normally to illuminate said photo-cell, said light source and photo-cell being so located with respect to said component stapling device that presence of said component at said component stapling device reduces the strength of said light at said photo-cell, whereby a signal is generated by said photo-cell, means responsive to said signal for actuating said component stapling device to perform a stapling operation, means for positioning said circuit board automatically with respect to said component stapling device to a position appropriate to said component, and means for initiating operation of said means for feeding only following said positioning of said circuit board.

11. In a system for fabricating electrical assemblies, a component stapling device, each of said components including a relatively fragile body and a pair of metallic leads extending from said fragile body, said component stapling device including means for forming said metallic leads as staple elements while maintaining said fragile body free of stress and strain, means for feeding said components to said device one at a time, electrical means for sensing the arrival of one of said components at said device and for generating a signal in response to said arrival, and means for actuating said component stapling device in response to said signal.

12. The combination according to claim 11 wherein said electrical means includes a photo-cell and a source of illumination for said photo-cell.

13. The combination according to claim 11 wherein said electrical means is photo-electric.

14. In a system for fabricating electrical assemblies comprised of pre-tinned printed circuit wafers to which are stapled electrical components, said components each including a fragile body and a pair of wire leads extending from said fragile body, wherein said wire leads form staple elements which are stapled to said wafer, a unit for forming and inserting said staple elements, means for feeding components one by one to said unit, electrical means for sensing arrival of each component at said unit and for generating a signal in response to said arrival, means responsive to said signal for actuating said unit to form said wire leads as staple elements, to insert said staple elements through said wafer, means for at will selecting plural positions for said wafer, and means for initiating operation of said means for feeding components only while said wafer is in one of said plural positions.

15. A system for assembling electrical components to wafers, said system including means for abstracting wafers one by one from a stack of wafers, a wafer positioning holder having a wafer insertion position, means for feeding each abstracted wafer to said wafer positioning holder while said wafer positioning holder is in said wafer insertion position, means for positioning said wafer positioning holder in sequence in a plurality of further positions different from said insertion position, means for locking said wafer positioning holder in each of said last-named positions, a staple forming and insertion unit, means for supplying one component to said staple forming and insertion unit for each positioning of said wafer, and means for actuating said staple forming and insertion unit to form said leads as staple elements and to insert such staple elements in stapled relation to said wafer.

16. A machine for automatically fabricating electrical assemblies, each assembly comprising a wafer having secured thereto at least one electrical component having leads, said system including means for abstracting wafers one by one from a stack of wafers, a wafer conveyor, means for actuating said wafer conveyor to move said wafers one by one to a component insertion position, means for transferring said wafers from said conveyor at said component insertion position and to a wafer positioning holder, means for positioning said wafer positioning holder in sequence in a plurality of positions with respect to said component insertion position, means for supplying components to said component insertion position, means for sensing the arrival of each of said components at said component insertion position, a component forming and insertion device at said component insertion position, means responsive to said sensing for actuating said forming and insertion device, said component forming and insertion device being arranged and adapted when actuated to form the leads of one of said electrical components as staple elements.

17. A system for fabricating electrical assemblies each comprising a wafer and having secured thereto a plurality of electrical components, each of said components including a relatively fragile body and two oppositely extending wire leads, said wafer having a plurality of aperture pairs at discrete positions of said wafer, means for supplying in a predetermined sequence a plurality of said components, wherein at least some of the supplied components of said sequence are of distinguishable character, an electrically controlled unit for controlling the energized condition of control circuits, a pneumatic conveyor, means responsive to energization of each selected one of said control circuits for depositing a different predetermined one of said components in said pneumatic conveyor, said pneumatic conveyor having air jets arranged for projecting said components to a staple forming and inserting position, a staple forming and inserting head located at said position and arranged to form said wire leads as staple elements and for inserting said staple elements into said wafer via one of said apertured pairs.

18. In a system for fabricating electrical sub-assemblies comprising pre-wired wafers to which are stapled electrical components, a plurality of component supply devices, each of said supply devices containing a plurality of components of the same character, and the different supply devices containing components of different character, a wafer supply device, a stapling station, means for at will feeding a single component from any of said supply devices to said stapling station, means for transferring a wafer from said wafer supply device to said stapling station, and means for interlocking operation of said means for transferring and said means for at will feeding components from any of said supply devices so that operation of said last means are mutually exclusive.

19. A system for automatically fabricating electrical assemblies, each assembly comprising a wafer having secured thereto at least one electrical component having leads, said system including means for abstracting wafers one by one from a stack of wafers, a wafer positioning holder having a wafer insertion position, means for positioning said wafer positioning holder in sequence in a plurality of positions different from said insertion position, means for locking said wafer positioning holder in each of said last named positions, a staple forming and insertion unit, means for supplying one component to said unit for each position of said wafer, and means for actuating said unit to form said leads as staple elements and to insert said staple elements in stapled relation to said wafer.

References Cited in the file of this patent

UNITED STATES PATENTS

| 298,117 | Preusse | May 6, 1884 |
| 2,631,213 | Martines | Mar. 10, 1953 |
| 2,748,388 | Cardani | June 5, 1956 |
| 2,772,416 | Dorosz | Dec. 4, 1956 |

OTHER REFERENCES

"Mechanized Production of Miniature Electronic Packaged Subassemblies Using Modular Construction," Final Report, Feb. 28, 1953, Melpar, Inc., Alexandria, Va., pages 25–39. (Copy in Div. 11.)